(12) United States Patent
Li et al.

(10) Patent No.: US 11,665,365 B2
(45) Date of Patent: May 30, 2023

(54) MOTION PREDICTION CODING WITH COFRAME MOTION VECTORS

(71) Applicant: GOOGLE LLC, Mountain View, CA (US)

(72) Inventors: Bohan Li, Santa Barbara, CA (US); Yaowu Xu, Saratoga, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 641 days.

(21) Appl. No.: 16/131,133

(22) Filed: Sep. 14, 2018

(65) Prior Publication Data
US 2020/0092576 A1 Mar. 19, 2020

(51) Int. Cl.
*H04N 19/52* (2014.01)
*H04N 19/176* (2014.01)
*H04N 19/577* (2014.01)

(52) U.S. Cl.
CPC ........... *H04N 19/52* (2014.11); *H04N 19/176* (2014.11); *H04N 19/577* (2014.11)

(58) Field of Classification Search
None
See application file for complete search history.

(56) References Cited

U.S. PATENT DOCUMENTS

| | | | | |
|---|---|---|---|---|
| 5,574,663 | A | * | 11/1996 | Ozcelik ................. H04N 19/543 709/247 |
| 6,055,274 | A | * | 4/2000 | McVeigh ............. H04N 19/597 375/240.16 |
| 7,567,617 | B2 | | 7/2009 | Holcomb |
| 2003/0076883 | A1 | * | 4/2003 | Bottreau ................. H04N 19/51 375/240.12 |
| 2003/0081679 | A1 | * | 5/2003 | Kesaniemi ........... H04N 19/537 375/240.16 |

(Continued)

FOREIGN PATENT DOCUMENTS

| WO | WO-2009028780 A1 | * | 3/2009 | ........... H04N 19/593 |
|---|---|---|---|---|
| WO | 2017036399 A1 | | 3/2017 | |

OTHER PUBLICATIONS

Tech, Gerhard & Wegner, Krzysztof & Chen, Ying & Yea, Sehoon. (2012). 3D-HEVC Test Model 1. JCT-3V document A1005. (Year: 2012).*

(Continued)

*Primary Examiner* — Stefan Gadomski
(74) *Attorney, Agent, or Firm* — Young Basile Hanlon & MacFarlane, P.C.

(57) ABSTRACT

Video coding may include generating, by a processor executing instructions stored on a non-transitory computer-readable medium, an encoded frame by encoding a current frame from an input bitstream, by generating a reference coframe spatiotemporally corresponding to the current frame, wherein the current frame is a frame from a sequence of input frames, wherein each frame from the sequence of input frames has a respective sequential location in the sequence of input frames, and wherein the current frame has a current sequential location in the sequence of input frames, and encoding the current frame using the reference coframe. Video coding may include including the encoded frame in an output bitstream and outputting the output bitstream.

15 Claims, 18 Drawing Sheets

(56) References Cited

U.S. PATENT DOCUMENTS

| | | | |
|---|---|---|---|
| 2004/0001546 A1* | 1/2004 | Tourapis | H04N 19/56 375/240.12 |
| 2004/0037471 A1* | 2/2004 | Laurent-Chatenet | H04N 19/109 382/236 |
| 2004/0057523 A1* | 3/2004 | Koto | H04B 1/662 375/240.26 |
| 2004/0228410 A1* | 11/2004 | Ameres | H04N 19/52 375/240.18 |
| 2005/0036064 A1* | 2/2005 | Lee | H04N 7/0137 348/452 |
| 2005/0152452 A1* | 7/2005 | Suzuki | H04N 19/176 375/240.16 |
| 2008/0285654 A1* | 11/2008 | Cai | H04N 19/597 375/240.16 |
| 2009/0010323 A1* | 1/2009 | Su | H04N 19/573 375/240.01 |
| 2009/0060359 A1* | 3/2009 | Kim | H04N 19/563 382/236 |
| 2009/0232214 A1* | 9/2009 | Ghanbari | H04N 19/895 375/240.16 |
| 2010/0201870 A1* | 8/2010 | Luessi | H04N 19/86 348/452 |
| 2011/0032980 A1* | 2/2011 | Gao | H04N 19/597 375/240.01 |
| 2012/0027095 A1* | 2/2012 | Sakamoto | H04N 19/533 375/240.16 |
| 2012/0075535 A1* | 3/2012 | Van Beek | H04N 5/145 348/699 |
| 2012/0163473 A1* | 6/2012 | Laroche | H04N 19/61 375/240.24 |
| 2012/0189053 A1* | 7/2012 | Chen | H04N 19/105 375/240.12 |
| 2012/0294362 A1* | 11/2012 | Sikora | H04N 19/82 375/240.14 |
| 2012/0314027 A1 | 12/2012 | Tian et al. | |
| 2012/0320984 A1* | 12/2012 | Zhou | H04N 19/50 375/240.16 |
| 2013/0004093 A1* | 1/2013 | Sugio | H04N 19/513 382/236 |
| 2013/0147915 A1* | 6/2013 | Wiegand | H04N 19/597 348/43 |
| 2013/0293676 A1* | 11/2013 | Sugio | H04N 19/597 348/43 |
| 2014/0086328 A1* | 3/2014 | Chen | H04N 19/52 375/240.16 |
| 2014/0126642 A1* | 5/2014 | Takahashi | H04N 19/105 375/240.16 |
| 2014/0254682 A1* | 9/2014 | Chen | H04N 19/597 375/240.16 |
| 2014/0286433 A1* | 9/2014 | He | H04N 19/91 375/240.16 |
| 2015/0016531 A1* | 1/2015 | Hannuksela | H04N 19/70 375/240.16 |
| 2015/0055706 A1 | 2/2015 | Xu et al. | |
| 2015/0085929 A1* | 3/2015 | Chen | H04N 19/52 375/240.13 |
| 2015/0085935 A1* | 3/2015 | Chen | H04N 19/597 375/240.16 |
| 2015/0208074 A1* | 7/2015 | Takahashi | H04N 19/597 382/233 |
| 2016/0100188 A1* | 4/2016 | Chuang | H04N 19/105 375/240.16 |
| 2016/0219299 A1* | 7/2016 | Mora | H04N 19/597 |
| 2017/0006284 A1* | 1/2017 | Gokhale | H04N 19/124 |
| 2017/0026662 A1* | 1/2017 | Lee | H04N 19/513 |
| 2017/0048553 A1* | 2/2017 | Mukherjee | H04N 19/176 |
| 2017/0085890 A1* | 3/2017 | Choi | H04N 19/187 |
| 2017/0094305 A1 | 3/2017 | Li et al. | |
| 2017/0127060 A1* | 5/2017 | Park | H04N 19/157 |
| 2017/0150179 A1* | 5/2017 | Park | H04N 19/176 |
| 2018/0176599 A1* | 6/2018 | Park | H04N 19/597 |
| 2018/0184108 A1* | 6/2018 | Zhang | H04N 19/52 |
| 2018/0192072 A1 | 7/2018 | Chen et al. | |
| 2018/0278951 A1* | 9/2018 | Seregin | H04N 19/70 |
| 2018/0359483 A1* | 12/2018 | Chen | H04N 19/44 |
| 2019/0182504 A1* | 6/2019 | Lainema | H04N 19/54 |

OTHER PUBLICATIONS

Da Liu et al: "Direct Mode Coding for B Pictures using Virtual Reference Picture", Multimedia and Expo, 2007 IEEE International Conference on, IEEE, PI, Jul. 2007, pp. 1363-1366.

Yi Chin et al: "Dense true motion field compensation for video coding", 2013 IEEE International Conference on Image Processing, IEEE, Sep. 15, 2013, pp. 1958-1961.

International Search Report and Written Opinion dated Sep. 11, 2019; for International Application No. PCT/US2019034107; pp. 1-14.

Bankoski, et al., "Technical Overview of VP8, an Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving Video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

MOTION PREDICTION CODING WITH COFRAME MOTION VECTORS

BACKGROUND

Digital images and video can be used, for example, on the internet, for remote business meetings via video conferencing, high definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using motion prediction coding with coframe motion vectors.

SUMMARY

This application relates to encoding and decoding of image data, video stream data, or both for transmission or storage. Disclosed herein are aspects of systems, methods, and apparatuses for encoding and decoding using motion prediction coding with coframe motion vectors.

An aspect is a method for video decoding comprising generating, by a processor executing instructions stored on a non-transitory computer-readable medium, a decoded frame by decoding a current frame from an encoded bitstream. Decoding includes identifying a current block from the current frame, identifying a previously decoded block based on the coding information for the current block, determining whether motion information for the previously decoded block includes a coframe motion vector for the previously decoded block, and determining whether to identify a prediction block for decoding the current block based on a reference coframe. Decoding includes, in response to a determination to omit identifying the prediction block for decoding the current block based on the reference coframe, and in response to a determination that the motion information for the previously decoded block includes the coframe motion vector for the previously decoded block, identifying an alignment block in the reference coframe based on a spatial location of the previously decoded block and the coframe motion vector for the previously decoded block, determining a motion vector for the alignment block based on motion field information for the alignment block, determining a motion vector prediction for the current block based on the motion vector for the alignment block and the coframe motion vector for the previously decoded block, determining a motion vector for the current block based on the motion vector prediction for the current block, and identifying the prediction block based on a reference frame indicated by the motion vector for the current block. Video coding includes, in response to a determination to identify the prediction block for decoding the current block based on the reference coframe and in response to a determination that the motion information for the previously decoded block includes the coframe motion vector for the previously decoded block, determining a coframe motion vector prediction for the current block based on the coframe motion vector for the previously decoded block. Video coding includes, in response to a determination to identify the prediction block for decoding the current block based on the reference coframe and in response to a determination that the motion information for the previously decoded block omits the coframe motion vector for the previously decoded block, identifying a forward motion vector from the motion information for the previously decoded block, identifying a backward motion vector from the motion information for the previously decoded block, determining a coframe motion vector prediction for the current block based on the forward motion vector and the backward motion vector, determining a coframe motion vector for the current block based on the coframe motion vector prediction for the current block, and identifying the prediction block based on the reference coframe frame and the coframe motion vector for the current block. Video coding includes generating a decoded block corresponding to the current block based on the prediction block, including the decoded block in the decoded frame. The method includes outputting a reconstructed frame based on the decoded frame.

Another aspect is a method for video encoding comprising generating, by a processor executing instructions stored on a non-transitory computer-readable medium, an encoded frame by encoding a current frame from an input bitstream. Encoding includes identifying a current block from the current frame, identifying a previously coded block, determining whether motion information for the previously coded block includes a coframe motion vector for the previously coded block, and determining whether to identify a prediction block for encoding the current block based on a reference coframe. Encoding includes, in response to a determination to omit identifying the prediction block for encoding the current block based on the reference coframe and in response to a determination that the motion information for the previously coded block includes the coframe motion vector for the previously coded block, identifying an alignment block in the reference coframe based on a spatial location of the previously coded block and the coframe motion vector for the previously coded block, determining a motion vector for the alignment block based on motion field information for the alignment block, determining a motion vector prediction for the current block based on the motion vector for the alignment block and the coframe motion vector for the previously coded block, and including an indication of the motion vector prediction for the current block in an output bitstream. Encoding includes in response to a determination to identify the prediction block for encoding the current block based on the reference coframe and in response to a determination that the motion information for the previously coded block includes the coframe motion vector for the previously coded block, determining the coframe motion vector prediction for the current block based on the coframe motion vector for the previously coded block. Encoding includes in response to a determination to identify the prediction block for encoding the current block based on the reference coframe and in response to a determination that the motion information for the previously coded block omits the coframe motion vector for the previously coded block, identifying a forward motion vector from the motion information for the previously coded block, identifying a backward motion vector from the motion information for the previously coded block, and determining a coframe motion vector prediction for the current block based on the forward motion vector and the backward motion vector. Encoding includes including the indication of the coframe motion vector prediction for the current block in the output bitstream. The method includes outputting the output bitstream.

Another aspect is a method for video encoding comprising generating, by a processor executing instructions stored on a non-transitory computer-readable medium, an encoded frame by encoding a current frame from an input bitstream. Encoding includes generating a reference coframe spatiotemporally corresponding to the current frame, wherein the current frame is a frame from a sequence of input frames, wherein each frame from the sequence of input frames has a respective sequential location in the sequence of input frames, and wherein the current frame has a current sequential location in the sequence of input frames, and encoding the current frame using the reference coframe. The method includes including the encoded frame in an output bitstream and outputting the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Figure 1:
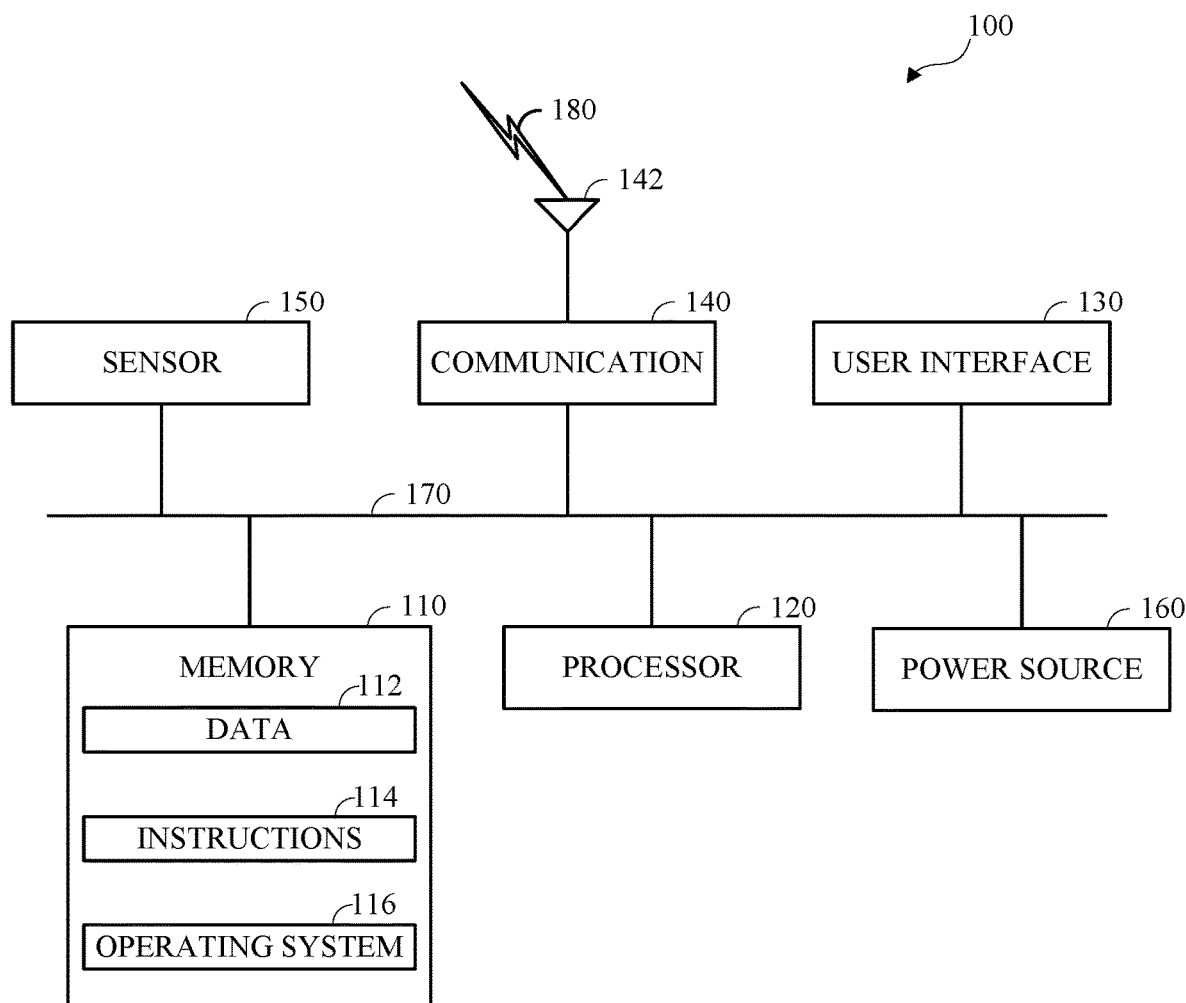
FIG. 1 is a diagram of a computing device in accordance with implementations of this disclosure.

Image and video compression schemes may include breaking an image, or frame, into smaller portions, such as blocks, and generating an output bitstream using techniques to limit the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to recreate the blocks and the source images from the limited information.

Inter-prediction, for example, may include encoding a current block from a current frame by encoding the difference between the current block and a prediction block. The prediction block may be generated based on image data from one or more reference frames available at the encoder and the decoder, such as one or more frames previously reconstructed in coding order, which may correspond to display frames sequentially before or after the current frame in input, or display, order. Some reference frames may be constructed, or alternate, reference frames, which may reference frames, having temporal locations differing from the temporal location of the current frame, that are used for coding and omitted from display. Some motion information may be unavailable for video coding using inter-prediction based on reference frames having temporal locations differing from the temporal location of the current frame.

Video coding using motion prediction coding with coframe motion vectors may improve the accuracy and efficiency of prediction coding by generating a reference coframe and predicting the current frame with reference to the reference coframe. The reference coframe may have a spatiotemporal location, which may include input sequence or frame index location, corresponding to the temporal location of the current frame. The reference coframe may be generated based on optical flow estimation, such as based on motion field information for the temporal location of the current frame, which may be referred to as a motion field-based reference frame or a motion field reference frame, and which may include a linear projection of previously generated motion information. A prediction block from the reference coframe may be indicated using a coframe motion vector indicating an offset or displacement from a spatial location in the reference coframe corresponding to the spatial location of the current block in the current frame.

To improve coding efficiency for coding the motion information for a block that is encoded with reference to a previously reconstructed frame at an input sequence location differing from the current frame, the motion information may be indicated in the encoded bitstream using information indicating a motion vector prediction, which may be a prediction of a motion vector for the current block of the current frame, and which may be generated based on a coframe motion vector for a previously coded block neighboring the current block in the current frame. The coframe motion vector may refer to the reference coframe, which is spatiotemporally concurrent with the current frame.

To improve coding efficiency for coding the motion information for a block that is encoded with reference to the reference coframe, the motion information may be indicated in the encoded bitstream using information indicating a coframe motion vector prediction, which may be a prediction of a coframe motion vector for the current block of the current frame, and which may be generated based on a coframe motion vector for a previously coded block neighboring the current block in the current frame or based on compound motion vectors for the previously coded block.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
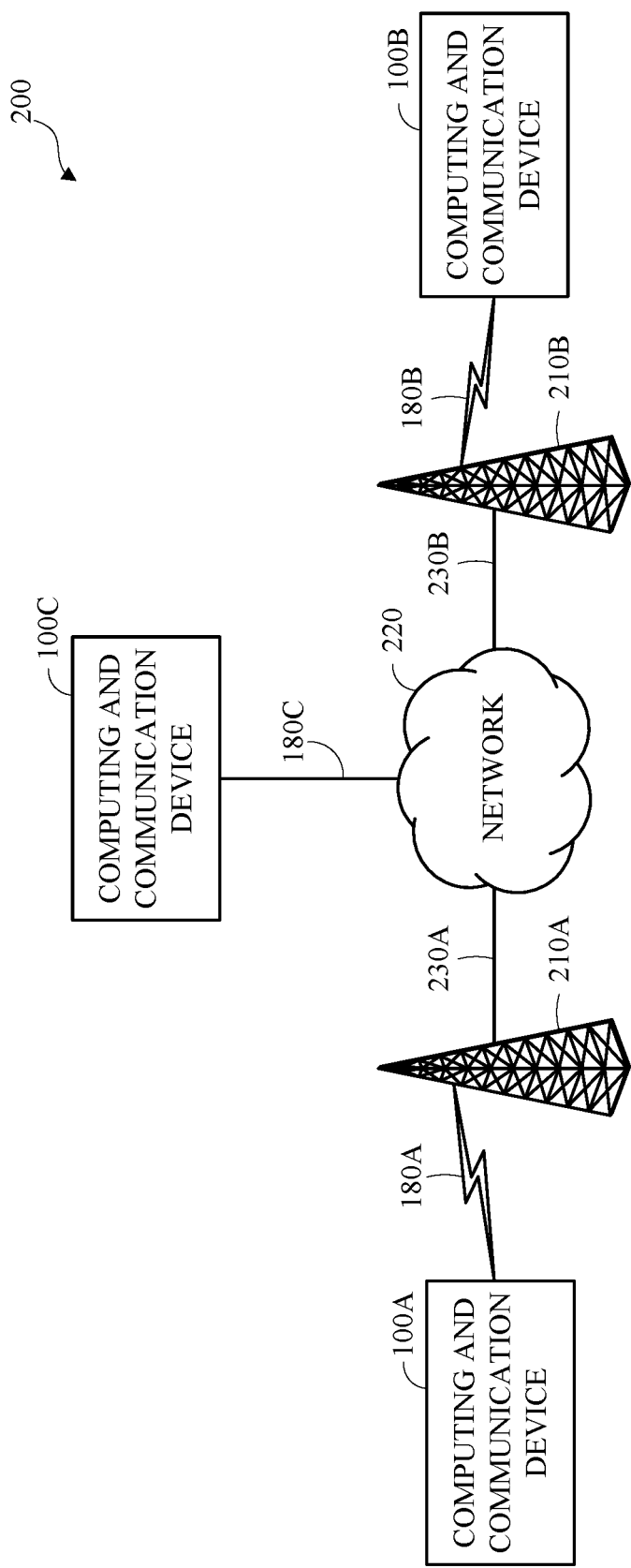
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
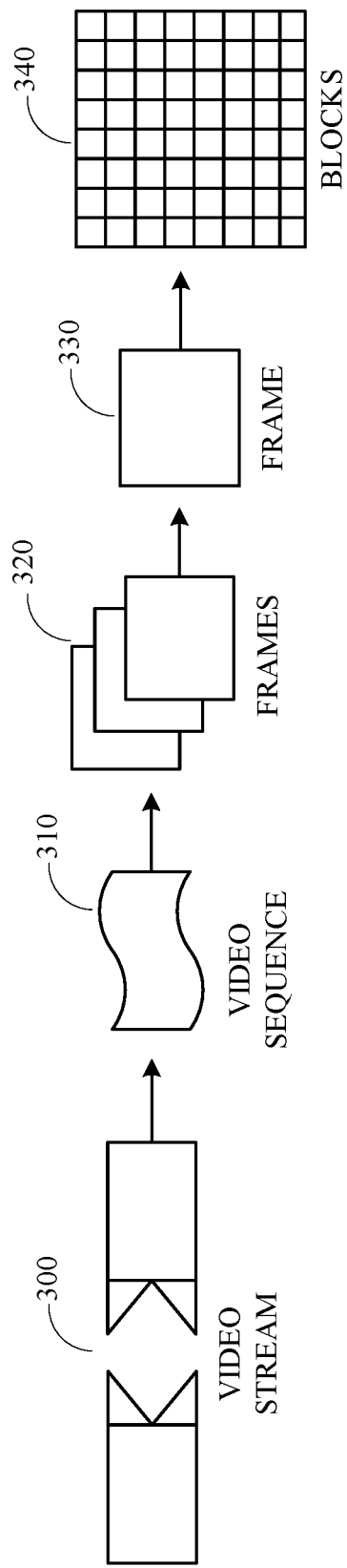
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
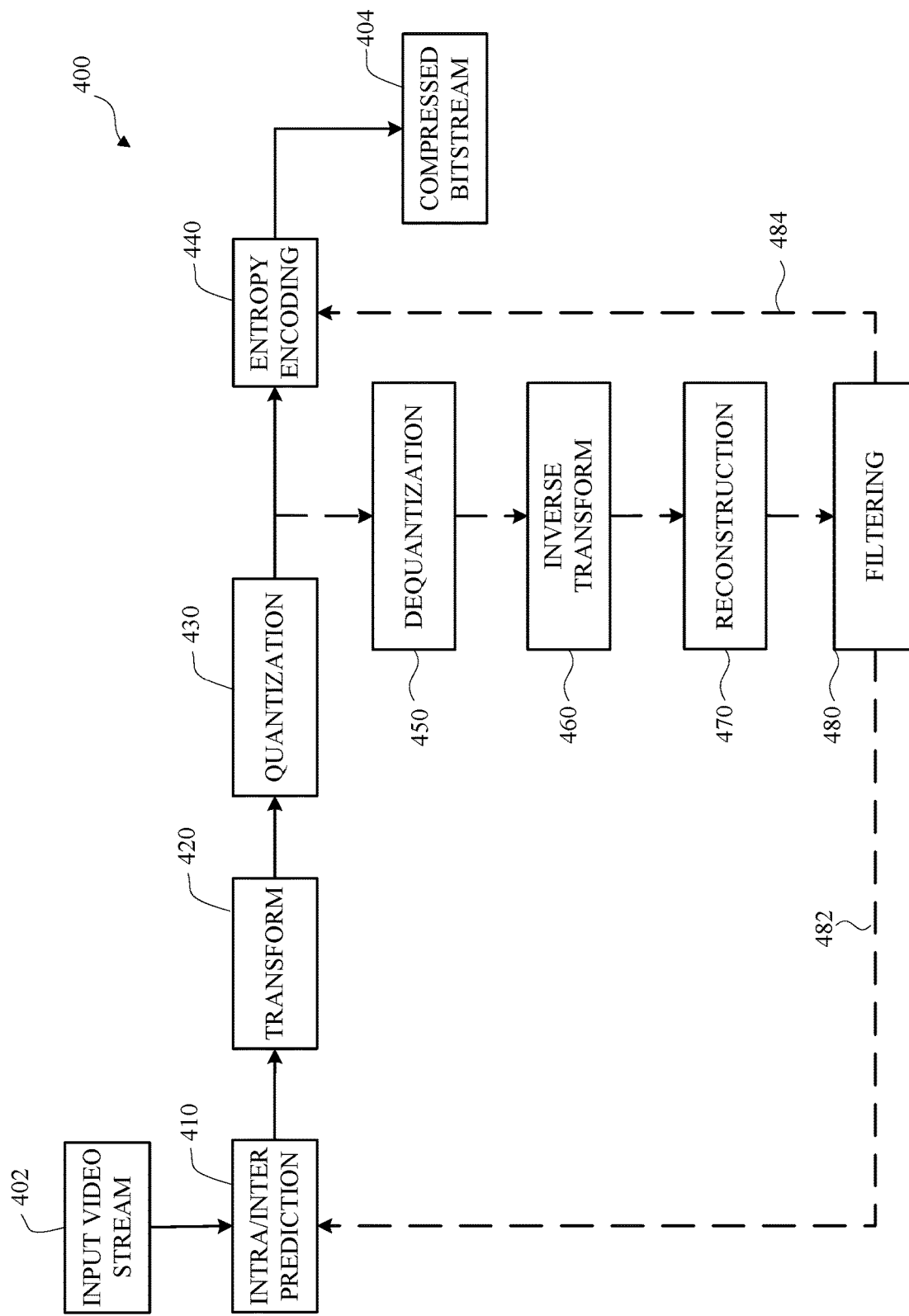
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
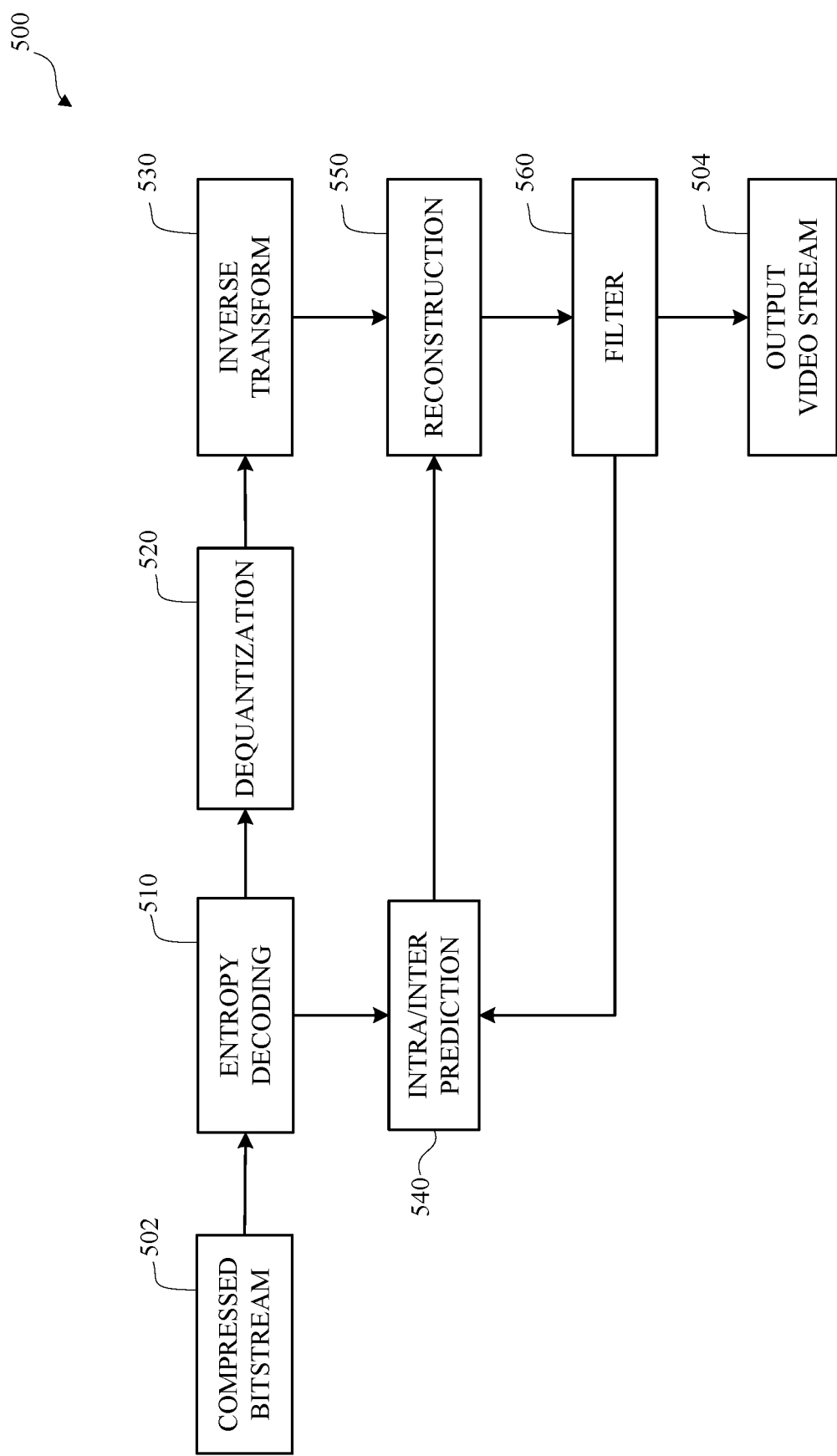
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
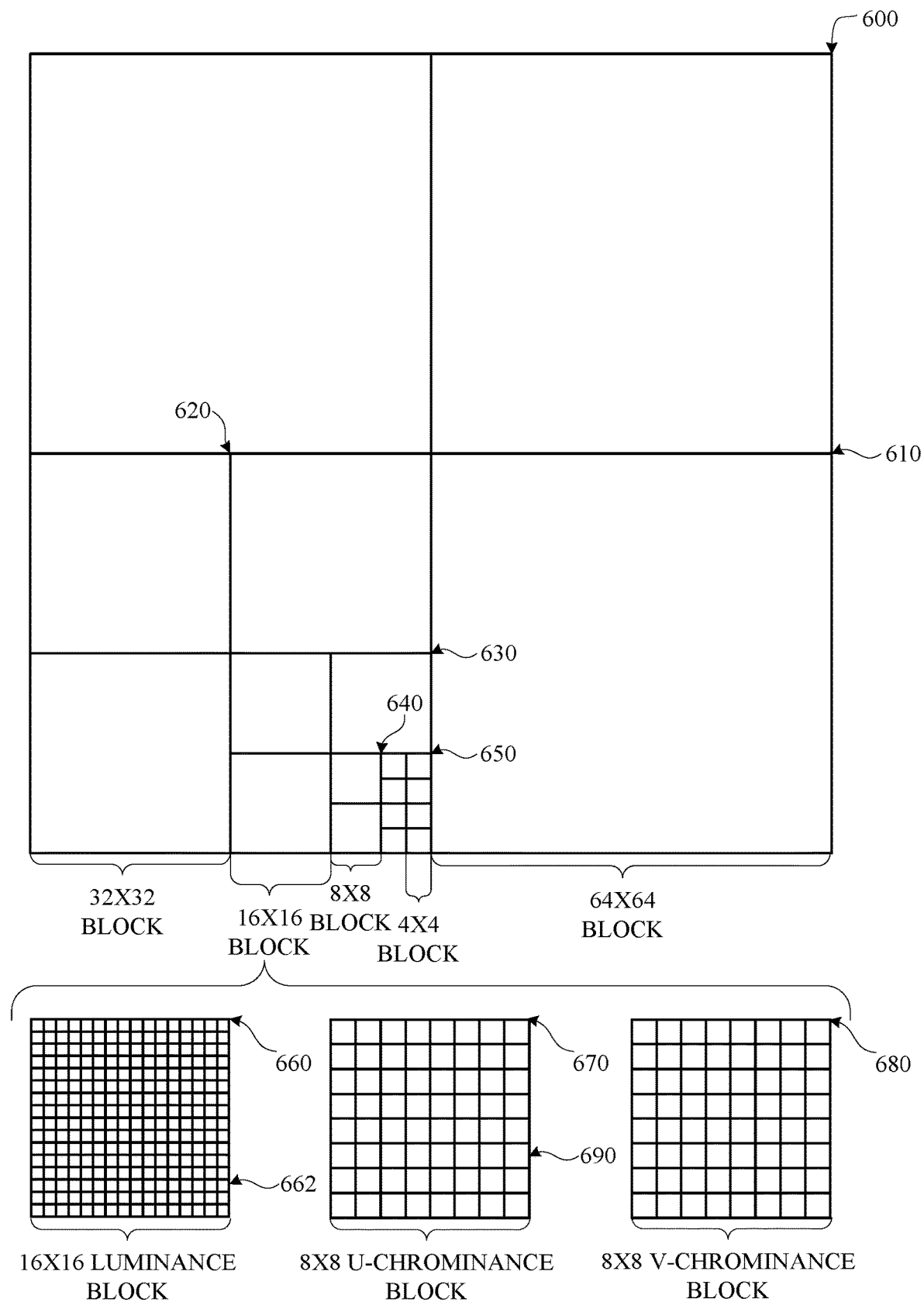
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties, and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
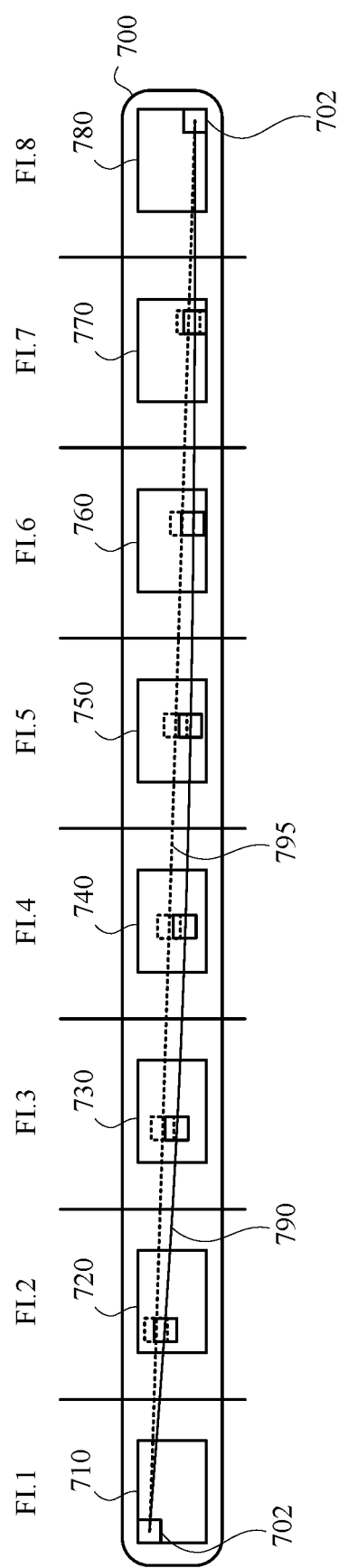
FIG. 7 is a block diagram of an example of a sequence of frames in accordance with implementations of this disclosure.

FIG. 7 is a block diagram of an example of a sequence 700 of frames in accordance with implementations of this disclosure. The sequence 700 represents a scene in which a square 702 moves from the top-left of the field of view to the bottom-right of the field of view. The sequence 700 includes input frames 710-780, which are shown in temporal order from left to right, which may be referred to as the input order or the frame index order, FI.1-FI.8. For example, the first input frame 710 may have a frame index of one (1), the second input frame 720 may have a frame index of two (2), the third input frame 730 may have a frame index of three (3), the fourth input frame 740 may have a frame index of four (4), the fifth input frame 750 may have a frame index of five (5), the sixth input frame 760 may have a frame index of six (6), the seventh input frame 770 may have a frame index of seven (7), and the eighth input frame 780 may have a frame index of eight (8).

The position of the square 702 in each respective frame 710-780 is shown as a solid line square. For example, the position of the square 702 in the first frame 710 is shown at the top-left of the first frame 710, and the position of the square 702 in the eighth frame 780 is shown at the bottom-right of the eighth frame 780. The square 702 moves along a non-linear path 790, shown using a solid line. An estimated linear path 795 from the position of the square 702 at the top-left of the first frame 710 to the position of the square 702 at the bottom-right of the eighth frame 780 is shown using a broken line. Estimated positions for the square 702 along the estimated linear path 795 are shown using broken line squares in the second frame 720, the third frame 730, the fourth frame 740, the fifth frame 750, the sixth frame 760, and the seventh frame 770.

Figure 8:
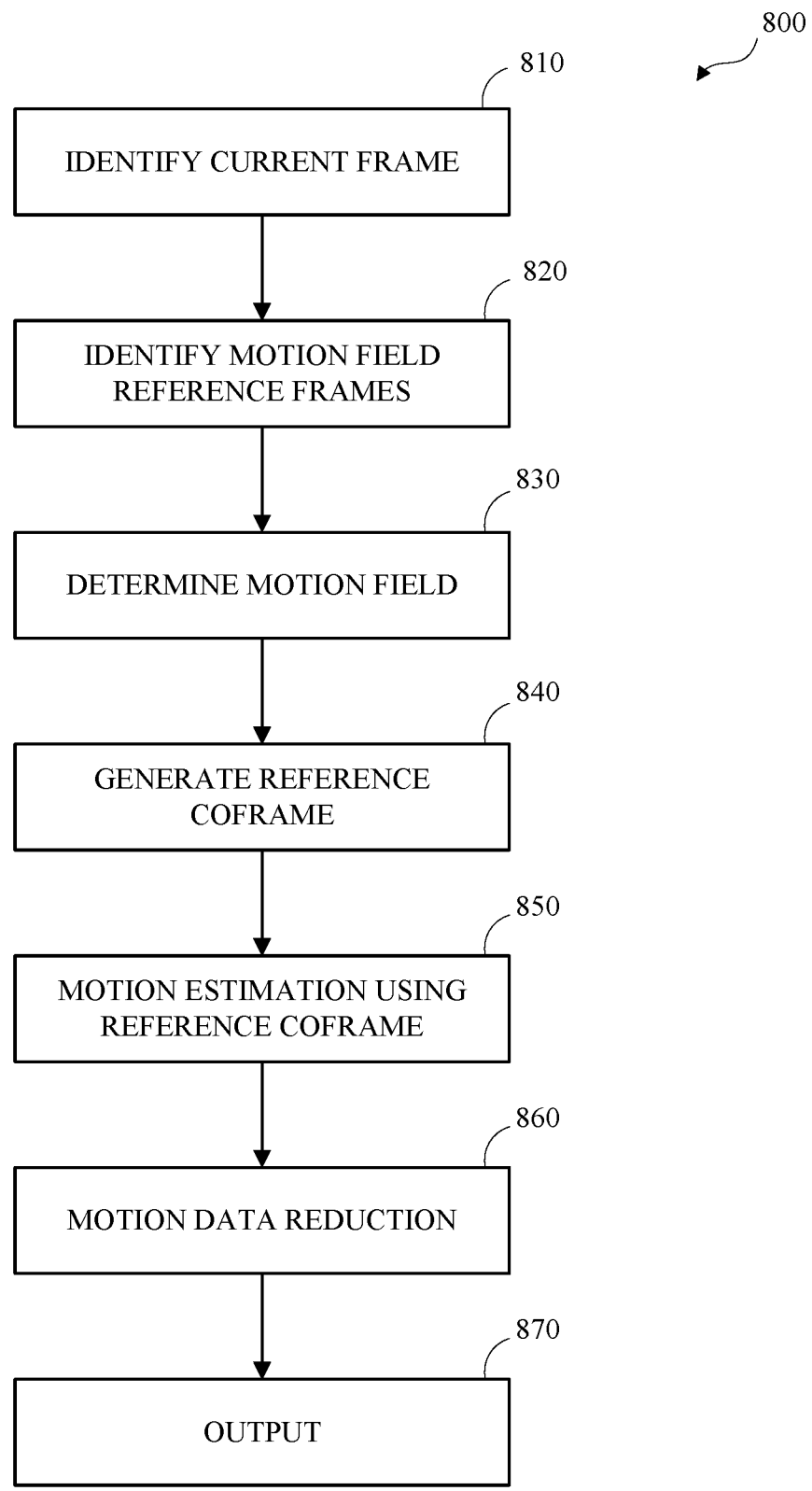
FIG. 8 is a flowchart diagram of an example of encoding using a reference coframe 800 in accordance with implementations of this disclosure.

FIG. 8 is a flowchart diagram of an example of encoding using a reference coframe 800 in accordance with implementations of this disclosure. Encoding using a reference coframe 800 may be implemented in an encoder, such as the encoder 400 shown in FIG. 4. For example, the intra/inter prediction unit 410 of the encoder 400 shown in FIG. 4, may implement encoding using a reference coframe 800. As shown in FIG. 8, encoding using a reference coframe 800 includes identifying a current input frame at 810, identifying motion field reference frames at 820, determining an estimated motion field at 830, generating a reference coframe at 840, motion estimation at 850, motion data reduction at 860, and output at 870.

A current input frame is identified at 810. Identifying the current frame includes identifying an input frame, such as one of the input frames 710-780 shown in FIG. 7. Identifying the current input frame may include determining that the current input frame is a frame from a sequence of input frames, identifying a coding order for coding the sequence of input frames, determining a current coding order, and identifying the current input frame according to the current coding order. For example, the sequence of frames may include eight frames, such as the frames 710-780 shown in FIG. 7, and a defined coding order, such as input order, or the first frame followed by the eighth frame followed by the fifth frame followed by the third frame followed by the second frame followed by the fourth frame followed by the sixth frame followed by the seventh frame.

The current input frame may be the first frame in the sequence of frames, such as the first frame 710 shown in FIG. 7, or may otherwise be identified as a golden frame, a key frame, or the encoder may otherwise identify a coding mode for the current frame as intra-coding, the current frame may be intra-coded to generate a first encoded frame, a first reconstructed frame may be generated by decoding and reconstructing the first encoded frame, and encoding using a reference coframe 800 may be omitted for the current frame.

Motion field reference frames are identified at 820. The current frame identified at 810 may be a frame identified for inter-prediction coding, such as one of the second through eighth frames 720-280 shown in FIG. 7, and the encoder may identify the reference frames available for inter-prediction coding as the motion field reference frames for coding the current frame. The motion field reference frames may be frames generated based on information currently available for decoding the encoded video sequence, such as previously reconstructed frames, which may include backward reference frames, which may be previously reconstructed frames sequentially preceding the current frame, such as in temporal or frame index order, or forward reference frames, which may be previously reconstructed frames sequentially subsequent to the current frame, such as in temporal or frame index order. For simplicity and clarity, the available reference frames identified at 820 may be referred to herein as motion field reference frames. The reference coframe may be generated based on the available reference frames, or a subset thereof, such as the nearest two reference frames in the forward and backward directions.

For example, the current frame may be the second frame coded in coding order, such as the eighth frame 780 shown in FIG. 7, which may be the last frame in the sequence of frames. The first reconstructed frame, corresponding to the first coded frame, may be identified as the motion field reference frames. The encoder may determine that the motion field reference frames omit inter-frame motion information. A second encoded frame may be generated by inter-coding the current frame with reference to the first reconstructed frame as a reference frame. A second reconstructed frame may be generated based on the second encoded frame for use as a reference frame. Encoding using a reference coframe 800 may be otherwise omitted for the current frame.

In another example, two or more available reference frames, which may include forward reference frames, backward reference frames, or both, may be identified as the motion field reference frames.

An estimated motion field is determined at 830. The encoder may determine that the motion field reference frames include inter-frame motion information representing motion intersecting, linearly, the current temporal location, which is the temporal location, or frame index location, for the current frame. For example, motion information indicating motion between the first frame of the sequence and the last frame of the sequence, such as a motion vector for the last frame of the sequence referencing a portion of the first reconstructed frame, intersects each other frame in the sequence.

The estimated motion field may be determined for a current temporal location corresponding to the current frame. Determining the estimated motion field may include identifying, such as on a per-pixel basis or a per-block basis, motion information, such as one or more motion vectors, intersecting the current temporal location. For example, a motion field reference frame may have a frame index greater than a current frame index of the current frame, a motion vector for the motion field reference frame may refer to a reconstructed reference frame that has a frame index prior to the current frame index, and the motion vector may be identified as intersecting the current temporal location. In another example, the motion field reference frame may have a frame index greater than the current frame index, a motion vector for the motion field reference frame may refer to a reconstructed reference frame that has a frame index greater than the current frame index, and the motion vector may be identified as non-intersecting with the current temporal location. In another example, the motion field reference frame may have a frame index less than the current frame index, a motion vector for the motion field reference frame may refer to a reconstructed reference frame that has a frame index less than the current frame index, and the motion vector may be identified as non-intersecting with the current temporal location. Each block, or each pixel, of each available reference frame may be evaluated to identify intersecting motion information.

The intersecting motion information may be projected to the current temporal location using linear projection. For a motion vector from the intersecting motion information, a current spatial location in the estimated motion field may be identified using linear projection at the intersection of the motion vector with the current temporal location. An available forward reference frame, such as the nearest, in temporal order, available forward reference frame, may be identified and a forward component of the estimated motion field, which may be an estimated forward motion vector, may be generated by projecting, such as using linear projection, from the spatial location in the estimated motion field to the identified forward reference frame based on the corresponding motion vector intersecting the current temporal location at the current spatial location. An available backward reference frame, such as the nearest, in temporal order, available backward reference frame, may be identified and a backward component of the estimated motion field, which may be an estimated backward motion vector, may be generated by projecting, such as using linear projection, from the spatial location in the estimated motion field to the identified backward reference frame based on the corresponding motion vector intersecting the current temporal location at the current spatial location. The estimated motion field, which may include the forward component and the backward component, may be determined for each spatial location, such as each block location, in at the estimated motion field location, which may have dimensions equivalent to the current input frame. For simplicity and clarity, the available forward reference frame and the available backward reference frame may be referred to as motion field projection frames.

A reference coframe is generated at 840. The reference coframe may be generated by interpolating pixel values from the reference frames indicated by the estimated motion field, such as the motion field projection frames. Although shown separately in FIG. 8, the motion field determination at 830 and the reference coframe generation at 840 may be performed in combination and may include multiple passes or processing levels, such as multiscale processing, which can include occlusion detection. Generating the reference coframe may include using a per-pixel motion field or a per-block motion field. In some implementations, generating the reference coframe may include using an affine homographic model. Other interpolation models may be used.

Motion estimation is performed for the current frame using the reference coframe at 850. The motion estimation may be similar to the motion estimation described in relation to FIG. 4, except as described herein or otherwise clear from context. For example, the intra/inter prediction unit 410 of the encoder 400 shown in FIG. 4, may perform the motion estimation. Motion estimation may be included in block-based coding for the current frame, which may include motion estimation at 850, motion data reduction at 860, and output at 870 for each block of the current frame, such as in a defined order, such as raster scan order, or another defined order. In some implementations, the encoder may determine a respective portion of the estimated motion field at 830 and generate a respective portion of the reference coframe at 840 on a block-by-block basis for blocks coded with relation to the reference coframe.

Motion estimation may include identifying a current block of the current input frame and generating a prediction block for encoding the current block. A prediction block may be generated based on a single reference frame, such as a backward reference frame, and may be referred to as a single reference coded block. A prediction block may be generated based on a multiple reference frames, such as a combination of a backward reference frame and a forward reference frame and may be referred to as a compound reference coded block. A prediction block may be generated based on a reference coframe and may be referred to as a coframe reference coded block.

Figure 10:
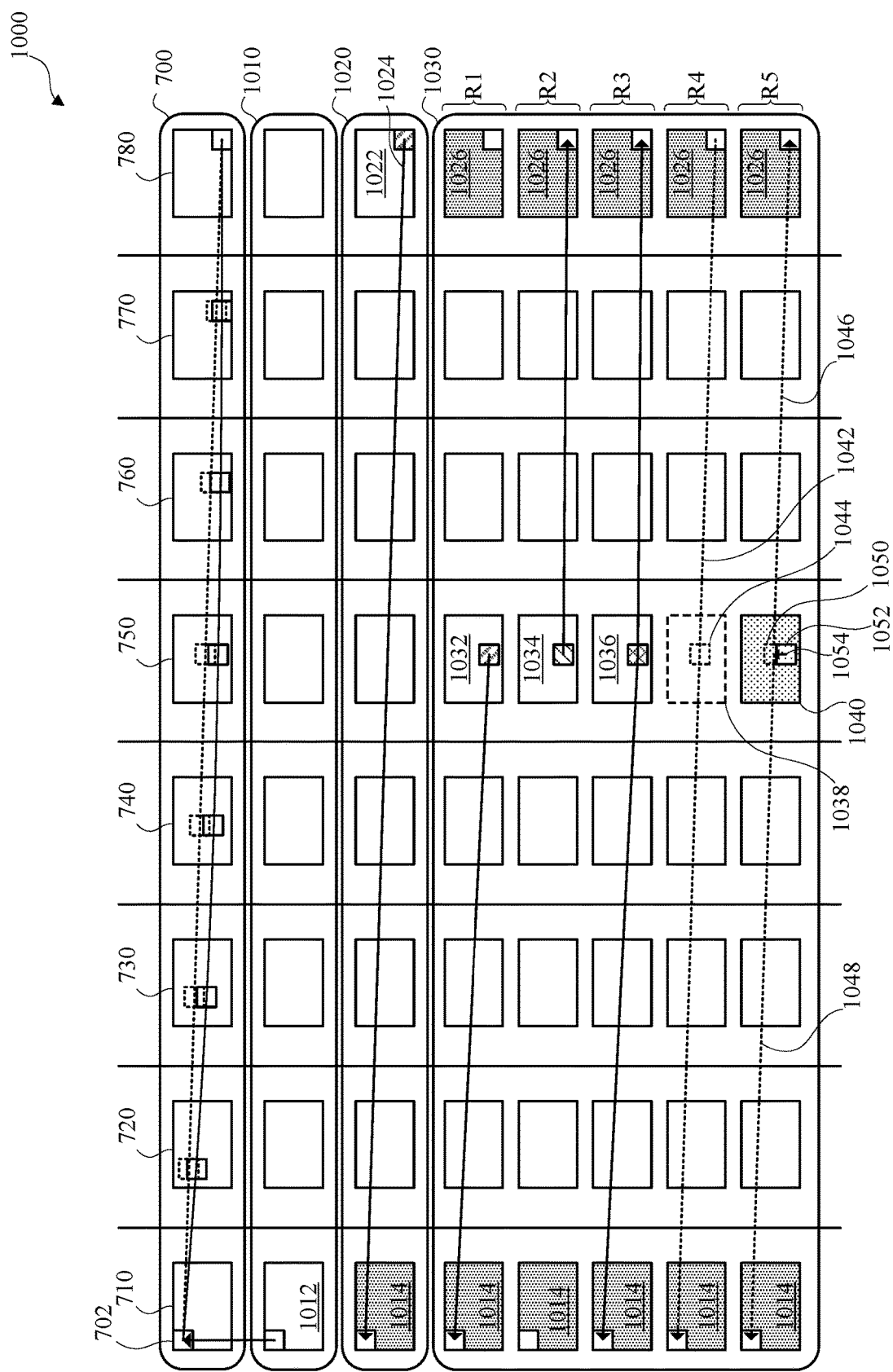
FIG. 10 is a block diagram of an example of a portion of coding a video sequence using a reference coframe in accordance with implementations of this disclosure.
Figure 11:
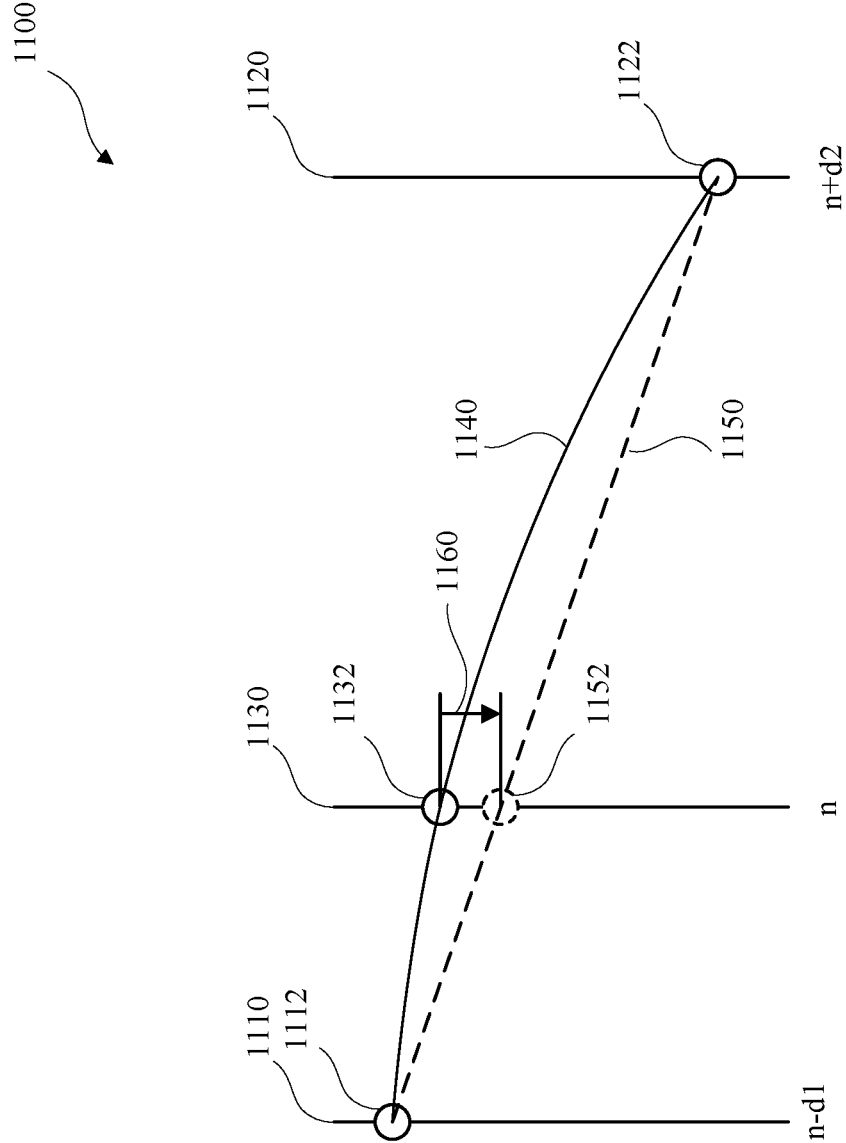
FIG. 11 is a diagram of an example of identifying a coframe motion vector in accordance with implementations of this disclosure.

For example, the motion estimation may include identifying the current block and generating the prediction block for the current block based on the reference coframe, such as by performing a motion search in the reference coframe. The prediction block may correspond spatially with a portion of the reference coframe and motion estimation may include identifying a coframe motion vector indicating a displacement between the spatial location of the current block in the current frame and the spatial location corresponding to the prediction block in the reference coframe. The coframe motion vector may represent a spatial divergence between the motion field linear projected motion-based reference coframe and non-linear motion captured by the input frames. An example of a portion of coding a video sequence, such as the video sequence 700 shown in FIG. 7, using a reference coframe is shown in FIG. 10. An example of generating a coframe motion vector is shown in FIG. 11. Other elements of encoding, such as the elements described in relation to FIG. 4, may be used.

Figure 12:
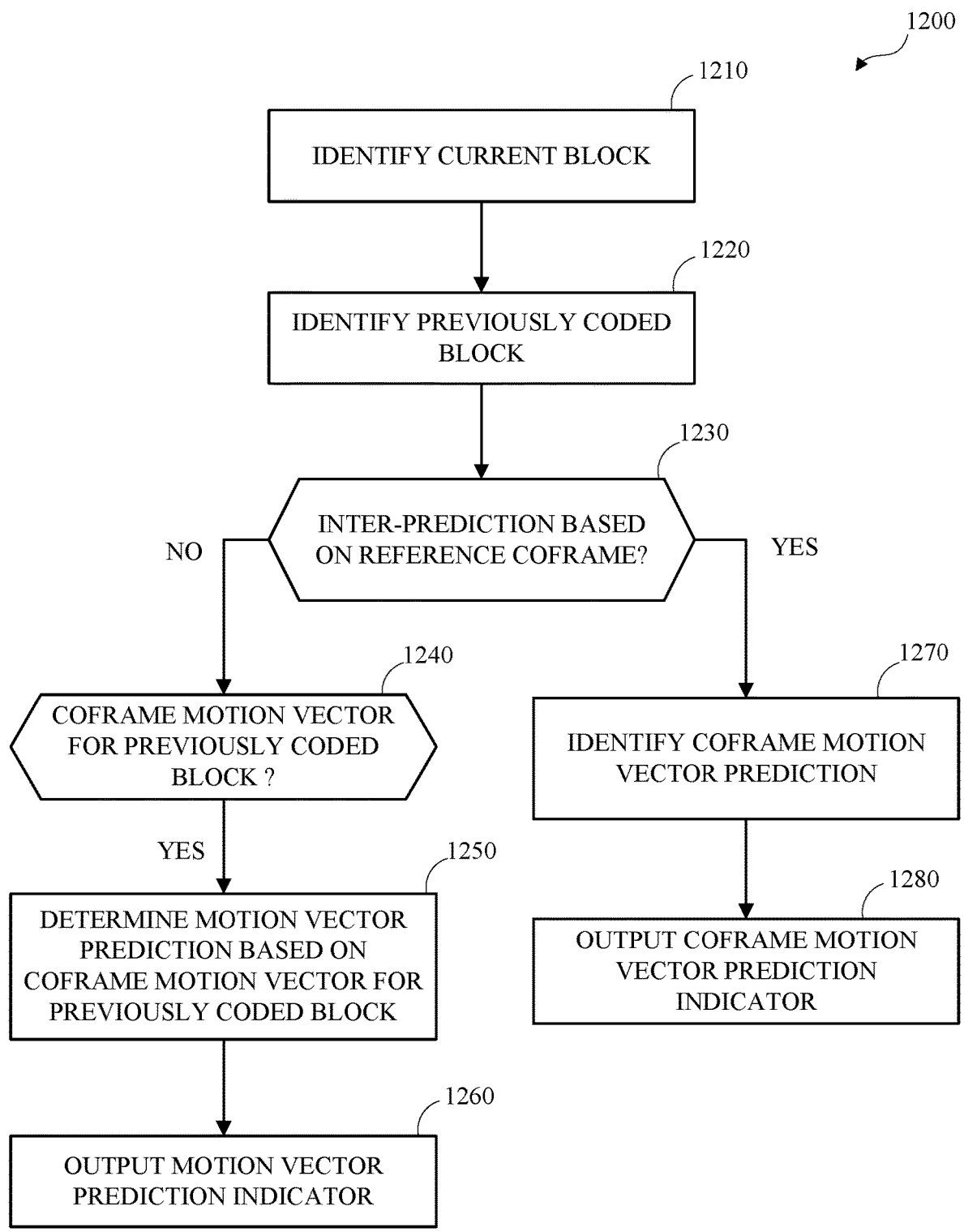
FIG. 12 is a flowchart diagram of an example of motion data reduction portion of inter-coding in accordance with implementations of this disclosure.

Motion data reduction is performed at 860. Motion data reduction may reduce the bandwidth utilization for storing or transmitting the motion information identified at 850 by identifying available, previously generated, context motion information, which may be available for decoding the motion information, and coding the motion information based on the context motion information. For example, a motion vector for a previously coded block neighboring the current block may be equivalent to the motion vector identified for the current block, and the motion vector identified for the current block may be coded as a reference to the previously coded neighboring block. In another example, the motion vector for the previously coded neighboring block may be similar to the motion vector for the current block, differential motion information based on a difference between the motion information identified at 850 and the motion vector for the previously coded neighboring block may be determined, and the motion vector identified for the current block may be coded as a reference to the previously coded neighboring block and the differential motion information. Identifying the context motion information may include evaluating multiple neighboring blocks and identifying the context motion information based on defined criteria, which may include order criteria. An example of motion data reduction is shown in FIG. 12.

The data generated by encoding using a reference coframe 800, or a portion thereof, is output at 870. For example, information, such as frame identifiers, indicating the reference frames, such as the forward reference frames and the backward reference frames, used for generating the motion field, the coframe motion vector, and the motion field motion vectors may be stored, such as on a per-block basis. The coframe motion vector, or corresponding differential motion information, and a residual difference between the current block and the prediction block may be encoded and included in an output bitstream, which may be stored, and which may be transmitted, or otherwise provided, to a decoder for decoding the encoded video.

Figure 9:
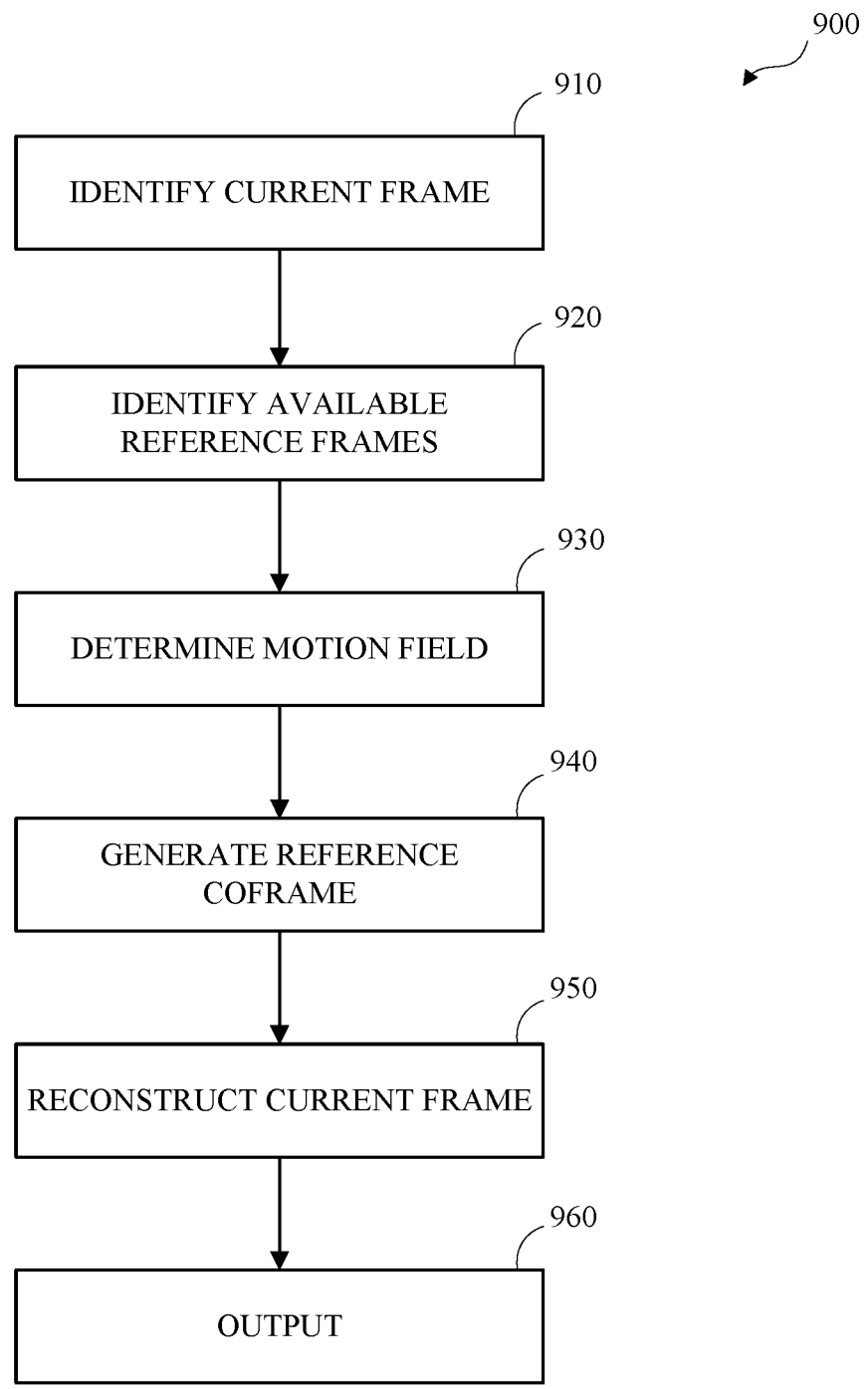
FIG. 9 is a flowchart diagram of an example of decoding using a reference coframe 900 in accordance with implementations of this disclosure.

FIG. 9 is a flowchart diagram of an example of decoding using a reference coframe 900 in accordance with implementations of this disclosure. Decoding using a reference coframe 900 may be implemented in a decoder, such as the decoder 500 shown in FIG. 5. For example, the intra/inter prediction unit 540 of the decoder 500 shown in FIG. 5, may implement decoding using a reference coframe 900. As shown in FIG. 9, decoding using a reference coframe 900 includes identifying a current encoded frame at 910, identifying motion field reference frames at 920, determining an estimated motion field at 930, generating a reference coframe at 940, reconstructing the current frame at 950, and output at 960.

A current encoded frame is identified at 910. Identifying the current encoded frame may include decoding, or partially decoding, encoded frame data from an encoded bitstream. For example, the decoder may receive a compressed bitstream, such as the compressed bitstream 404 shown in FIG. 4, including the encoded data, and may decode, or partially decode, the compressed bitstream to identify the encoded frame data, such as by entropy decoding the frame data and dequantizing the frame data. Identifying the current encoded frame may include identifying the residual data output by the encoder, such as shown at 860 in FIG. 8 or at 410 in FIG. 4.

Motion field reference frames are identified at 920. The current encoded frame identified at 910 may be a frame identified as inter-coded, such as one of the second through eighth frames 720-780 shown in FIG. 7, and the decoder may identify the reference frames available for inter-prediction coding as the motion field reference frames for coding the current frame. The motion field reference frames may be frames generated based on information currently available for decoding the decoded video sequence, such as previously reconstructed frames, which may include backward reference frames, which may be previously reconstructed frames sequentially preceding the current frame, such as in temporal or frame index order, or forward reference frames, which may be previously reconstructed frames sequentially subsequent to the current frame, such as in temporal or frame index order. For simplicity and clarity, the available reference frames identified at 920 may be referred to herein as motion field reference frames.

For example, the current frame may be the second frame coded in coding order, such as the eighth frame 780 shown in FIG. 7, which may be the last frame in the sequence of frames. The first reconstructed frame, corresponding to the first coded frame, may be identified as the motion field reference frames. The decoder may determine that the motion field reference frames omit inter-frame motion information. A second decoded frame may be generated by decoding, using inter-coding, the current encoded frame with reference to the first reconstructed frame as a reference frame. A second reconstructed frame may be generated based on the second decoded frame for use as a reference frame. Decoding using a reference coframe 900 may be otherwise omitted for the current frame.

In another example, two or more motion field reference frames, which may include forward reference frames, backward reference frames, or both, may be identified as the motion field reference frames. Inter-frame motion information may be available for one or more of the identified motion field reference frames.

An estimated motion field is determined at 930. The decoder may determine that the motion field reference frames include inter-frame motion information representing motion intersecting, linearly, the current temporal location, which is the temporal location, or frame index location, for the current frame. For example, motion information indicating motion between the first frame of the sequence and the last frame of the sequence, such as a motion vector for the last frame of the sequence referencing a portion of the first reconstructed frame, intersects each other frame in the sequence.

The estimated motion field may be determined for the current temporal location corresponding to the current frame. Determining the estimated motion field may include identifying, such as on a per-pixel basis or a per-block basis, motion information, such as one or more motion vectors, intersecting the current temporal location. For example, a motion field reference frame may have a frame index greater than a current frame index of the current frame, a motion vector for the motion field reference frame may refer to a reconstructed reference frame that has a frame index prior to the current frame index, and the motion vector may be identified as intersecting the current temporal location. In another example, the motion field reference frame may have a frame index greater than the current frame index, a motion vector for the motion field reference frame may refer to a reconstructed reference frame that has a frame index greater than the current frame index, and the motion vector may be identified as non-intersecting with the current temporal location. In another example, the motion field reference frame may have a frame index less than the current frame index, a motion vector for the motion field reference frame may refer to a reconstructed reference frame that has a frame index less than the current frame index, and the motion vector may be identified as non-intersecting with the current temporal location. Each block, or each pixel, of each motion field reference frame may be evaluated to identify intersecting motion information.

The intersecting motion information may be projected to the current temporal location using linear projection. For a motion vector from the intersecting motion information, a current spatial location in the estimated motion field may be identified using linear projection at the intersection of the motion vector with the current temporal location. An available forward reference frame, such as the nearest, in temporal order, available forward reference frame, may be identified and a forward component of the estimated motion field, which may be a forward motion vector, may be generated by projecting, such as using linear projection, from the spatial location in the estimated motion field to the identified forward reference frame based on the corresponding motion vector intersecting the current temporal location at the current spatial location. An available backward reference frame, such as the nearest, in temporal order, available backward reference frame, may be identified and a backward component of the estimated motion field, which may be a backward motion vector, may be generated by projecting, such as using linear projection, from the spatial location in the estimated motion field to the identified backward reference frame based on the corresponding motion vector intersecting the current temporal location at the current spatial location. The estimated motion field, which may include the forward component and the backward component, may be determined for each spatial location, such as each block location, in at the current temporal location, which may have dimensions equivalent to the current encoded frame. For simplicity and clarity, the available forward reference frame and the available backward reference frame may be referred to as motion field projection frames.

A reference coframe is generated at 940. The reference coframe may be generated by interpolating pixel values from the reference frames indicated by the estimated motion field, such as the motion field projection frames. Although shown separately in FIG. 9, the motion field determinization at 930 and the reference coframe generation at 940 may be performed in combination and may include multiple passes or processing levels, such as multiscale processing, which can include occlusion detection. Generating the reference coframe may include using a per-pixel motion field, or a per-block motion field. In some implementations, generating the reference coframe may include using an affine homographic model. Other interpolation models may be used.

Figure 15:
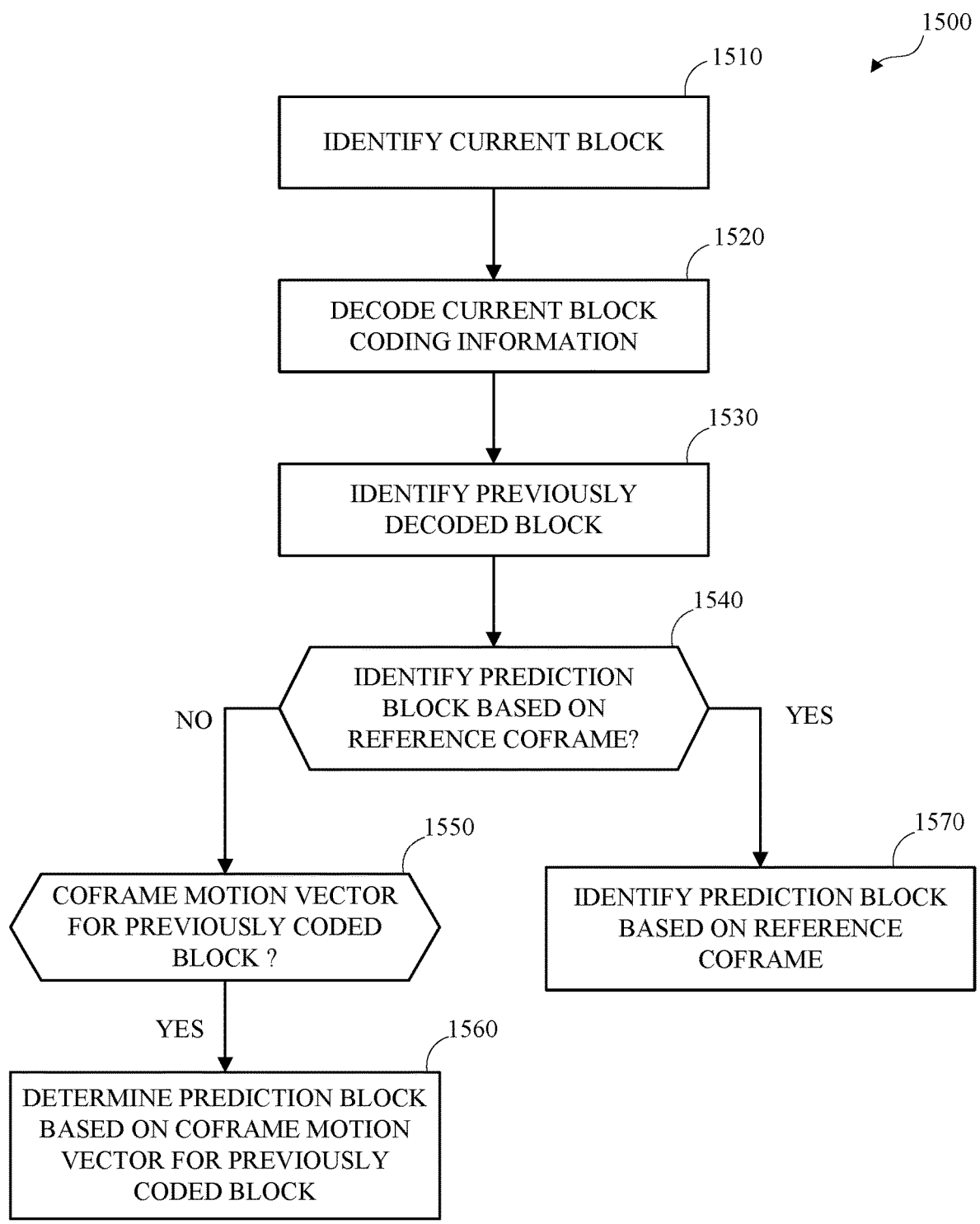
FIG. 15 is a flowchart diagram of an example of inter-prediction using a reference coframe in accordance with implementations of this disclosure.

A reconstructed current frame may be generated at 950. Decoding using a reference coframe 900 may be included in block-based decoding for the current frame, which may be similar to the block-based decoding in relation to FIG. 5, except as described herein or otherwise clear from context. For example, the current frame may be decoded on a block-basis, which may include decoding each block of the current frame, such as in a defined order, such as raster scan order, or another defined order. In some implementations, the decoder may determine a respective portion of the estimated motion field at 930 and generate a respective portion of the reference coframe at 940 on a block-by-block basis for blocks coded with relation to the reference coframe. Generating a current block of the reconstructed current frame may include inter-prediction using a reference coframe. An example of inter-prediction using a reference coframe is shown in FIG. 15. Other elements of decoding, such as the elements described in relation to FIG. 5, may be used.

The data generated by decoding using a reference coframe 900, or a portion thereof, is output at 960. For example, the reconstructed frame may be stored, such as for use as a reference frame for decoding another encoded frame. In another example, the reconstructed frame may be output to a presentation device for presentation to a user.

FIG. 10 is a block diagram of an example of a portion of coding a video sequence using a reference coframe 1000 in accordance with implementations of this disclosure. As used herein the term coding, or variations thereof, may refer to encoding, decoding, or respective variations thereof. The portion of coding a video sequence using a reference coframe 1000 may be implemented in an encoder, such as the encoder 400 shown in FIG. 4. For example, the intra/inter prediction unit 410 of the encoder 400 shown in FIG. 4, may implement the portion of coding a video sequence using a reference coframe 1000. The portion of coding a video sequence using a reference coframe 1000 may be implemented in a decoder, such as the decoder 500 shown in FIG. 5. For example, the intra/inter prediction 540 of the decoder 500 shown in FIG. 5, may implement the portion of coding a video sequence using a reference coframe 1000.

The portion of coding a video sequence using a reference coframe 1000 is described in reference to the input sequence 700 shown in FIG. 7, as shown at the top of FIG. 10. Coding the input sequence 700 may include coding the input frames 710-780 in a coding order that differs from the input order. For example, the first input frame 710 may be coded first in coding order, the eighth input frame 780 may be coded second in coding order, the fifth input frame 750 may be coded third in coding order, the third input frame 730 may be coded fourth in coding order, the second input frame 720 may be coded fifth in coding order, the fourth input frame 740 may be coded sixth in coding order, the sixth input frame 760 may be coded seventh in coding order, and the seventh input frame 770 may be coded eighth in coding order.

A first coding portion 1010, in coding order, is shown below the input sequence 700. The first coding portion 1010 includes coding at least a portion of the first input frame 710, prior to coding the other input frames 720-780. In the first coding portion 1010 the first coded frame 1012 may be generated. For example, the first input frame 710 may be intra-coded to generate the first coded frame 1012, as indicated by the solid directional line between the first coded frame 1012 and the first input frame 710.

A second coding portion 1020, in coding order, is shown below the first coding portion 1010. The second coding portion 1020 includes coding at least a portion of the eighth input frame 780, prior to coding the second through seventh input frames 720-770. A first reconstructed frame 1014, which may be a reconstruction of the first input frame 710, may be generated based on the first coded frame 1012, as indicated by the stippled background at 1014. In the second coding portion 1020 the second coded frame 1022 may be generated. The eighth input frame 780 may be inter-coded to generate the second coded frame 1022 using the first reconstructed frame 1014, as indicated by the solid directional line 1024 between the second coded frame 1022 and the first reconstructed frame 1014. A portion of the second coded frame 1022 is shown using a backward-diagonal lined background to indicate inter-prediction from a reconstructed frame having a lower frame index, preceding the eighth input frame 780 in input sequence order. Although not shown in FIG. 10, one or more portions of the second coded frame 1022 may be generated using intra-coding based on the eighth input frame 780.

A third coding portion 1030, in coding order, is shown below the second coding portion 1020. The third coding portion 1030 includes coding at least a portion of the fifth input frame 750, prior to coding the second input frame 720, the third input frame 730, the fourth input frame 740, the sixth input frame 760, and the seventh input frame 770. A second reconstructed frame 1026, which may be a reconstruction of the eighth input frame 780, may be generated based on the second coded frame 1022, as indicated by the stippled background at 1026.

The third coding portion 1030 shown in FIG. 10 includes five rows, R1-R5 including respective examples, or portions thereof, of generating the third coded frame. For example, the third coded frame may be generated using inter-prediction with reference to the first reconstructed frame 1014 as shown in the first, or top, row R1. The third coded frame may be generated using inter-prediction with reference to the second reconstructed frame 1026 as shown in the second row R2. The third coded frame may be generated using inter-prediction, such as bi-direction prediction or compound prediction, with reference to the first reconstructed frame 1014 and the second reconstructed frame 1026 as shown in the third row R3. The third coded frame may be generated using inter-prediction with reference to a reference coframe as shown in the fourth and fifth rows R4-R5.

A first example of generating the third coded frame is shown at 1032 in the first row R1 of the third coding portion 1030 using the first reconstructed frame 1014 as a reference frame. A portion of the third coded frame is shown in the first example at 1032 using a backward-diagonal lined background to indicate inter-prediction from a reconstructed frame having a lower frame index, preceding the fifth input frame 750 in input sequence order.

A second example of generating the third coded frame is shown at 1034 in the second row R2 of the third coding portion 1030 using the second reconstructed frame 1026 as a reference frame. A portion of the third coded frame is shown in the second example at 1034 using a forward-diagonal lined background to indicate inter-prediction from a reconstructed frame having a greater frame index, subsequent to the fifth input frame 750 in input sequence order.

A third example of generating the third coded frame is shown at 1036 in the third row R3 of the third coding portion 1030 using the first reconstructed frame 1014 as a first reference frame and using the second reconstructed frame 1026 as a second reference frame. A portion of the third coded frame 1036 is shown in the third example at 1036 using a cross-hatched background to indicate bi-directional, or compound, inter-prediction from a forward reconstructed frame having a greater frame index, subsequent to the fifth input frame 750 in input sequence order, and a backward reconstructed frame having a lower frame index, preceding the fifth input frame 750 in input sequence order.

The fourth row R4 of the third coding portion 1030 includes a representation of a motion field 1038 at the video sequence location corresponding to the fifth frame index as indicated by the broken line rectangle. The fifth row R5 of the third coding portion 1030 includes a reference coframe 1040.

The reference coframe 1040 is generated for use as a reference frame for inter-predication for coding a frame at a corresponding frame index. The reference coframe 1040 is spatially and temporally concurrent with an input frame having the respective frame index. The reference coframe 1040 is generated based on information other than the corresponding input frame. The reference coframe 1040 may be generated by an encoder based on information available for coding the corresponding input frame other than the corresponding input frame. The reference coframe 1040 may be generated independently by a decoder for decoding an encoded frame having the respective frame index.

The reference coframe 1040 may be generated based on optical flow estimation and may be referred to as an optical flow-based reference frame. Optical flow estimation may include determining the motion field 1038 corresponding to the respective frame index, and the reference coframe 1040 may be referred to as a motion field-based reference frame. The motion field 1038 may be a per-pixel motion field or a per-block motion field.

Determining the motion field 1038 may include identifying reference frames, which may be previously reconstructed frames, available for coding a frame at the respective frame index for which corresponding motion information intersects the video sequence location corresponding to the respective frame index, such as the as the motion field reference frames described in FIGS. 8 and 9. For example, as indicated in the first, second, and third rows R1-R3 of the third coding portion 1030, the first reconstructed frame 1014 and the second reconstructed frame 1026 are reference frames for coding the fifth input frame 750 at the fifth frame index. The motion information corresponding to the second reconstructed frame 1026 includes a motion vector, as represented by the solid directional line 1024 in the second coding portion 1020, that references the first reconstructed frame 1014. For simplicity and clarity, the reference frames (e.g., the first reconstructed frame 1014 in this example) referenced by the motion information corresponding to the identified, previously reconstructed, motion field reference frames (e.g., the second reconstructed frame 1026 in this example) may be referred to herein as antecedent reference frames and the corresponding motion vectors (e.g., the motion vector represented by the solid directional line 1024 in the second coding portion 1020) may be referred to as trajectory motion vectors.

The trajectory motion vector 1042 corresponding to the motion vector represented by the solid directional line 1024 in the second coding portion 1020, is indicated by a broken directional line in the fourth row R4. The projected spatial location 1044 of the intersection of the trajectory motion vector 1042 with the video sequence location corresponding to the fifth frame index is indicated by a broken line square in the fourth row R4. The projected spatial location 1044 of the intersection of the trajectory motion vectors 1042 with the video sequence location corresponding to the fifth frame index corresponds to a probability that motion of the scene, or a portion thereof, captured by the sequence of frames has a trajectory between the respective frames along the trajectory motion vector 1042.

The trajectory motion vectors 1042 may be linearly projected to estimate the motion field 1038 at the corresponding video sequence location. The fifth row R5 includes a forward projected motion vector 1046 and a backward projected motion vector 1048 projected from the respective video sequence location, such as the video sequence location corresponding to the fifth frame index, to the motion field projection frames, which may be the reference frames available for coding the frame at the respective frame index, such as the first reconstructed frame 1014 and the second reconstructed frame 1026 in this example, based on the trajectory motion vectors 1042 using linear projection.

The reference coframe 1040 may be interpolated based on values, such as pixel values, from the motion field projection frames, which may be the reconstructed frames 1014, 1026, indicated by the projected motion vectors 1046, 1048. A portion 1050 of the reference coframe 1040 interpolated based on values, such as pixel values, from the motion field projection frames, which may be the reconstructed frames 1014, 1026, indicated by the projected motion vectors 1046, 1048, is indicated by a broken line box in the fifth row R5.

The fifth input frame 750, or a portion, such as a block, thereof may be encoded using the reference coframe 1040 for inter-prediction. For example, the fifth row R5 of the third coding portion 1030 includes a representation of a prediction block 1052 for inter-coding the fifth input frame 750 based on the reference coframe 1040, as indicated by a solid line square with a lightly stippled background. Inter-prediction of the prediction block 1052 based on the reference coframe 1040 may include identifying a coframe motion vector 1054 as indicated by the solid directional line from the prediction block 1052 to the corresponding portion 1050 of the reference coframe 1040. The coframe motion vector 1054 may indicate differences in motion between the corresponding input frame (e.g., the fifth input frame 750) and the motion field interpolated reference coframe 1040, such as differences corresponding to non-linear motion.

Although one trajectory motion vector 1042 is shown in FIG. 10, a reference coframe may be generated based on multiple trajectory motion vectors associated with various reconstructed reference frames. For example, a reference coframe at the fourth frame index corresponding to the fourth input frame 740 may be generated based on motion information, intersecting the video sequence location corresponding to the fourth frame index, between the eighth frame and the first frame, the fifth frame and the first frame, the third frame and the fifth frame, the third frame and the eighth frame, the second frame and the fifth frame, the second frame and the eighth frame, or a combination thereof.

FIG. 11 is a diagram of an example of identifying a coframe motion vector 1100 in accordance with implementations of this disclosure. Identifying a coframe motion vector 1100 may be similar to identifying a coframe motion vector as described in relation to motion estimation at 850 as shown in FIG. 8, except as described herein or otherwise clear from context. For example, the intra/inter prediction unit 410 of the encoder 400 shown in FIG. 4, may implement identifying a coframe motion vector 1100. Although FIG. 11 shows spatial positions using one spatial dimension, vertical, for simplicity and clarity, other spatial dimensions, such as horizontal, may be used.

FIG. 11 shows a representation of a first reconstructed frame 1110 as a solid vertical line on the left. A vertical component of a first spatial position 1112 of a portion, such as a pixel or a block, of the first reconstructed frame 1110 is shown as a solid line circle near the top of the representation of the first reconstructed frame 1110.

A representation of a second reconstructed frame 1120 is shown as a solid vertical line on the right. A vertical component of a second spatial position 1122 of a portion, such as a pixel or a block, of the second reconstructed frame 1120 is shown as a solid line circle near the bottom of the representation of the second reconstructed frame 1120.

A representation of a current frame 1130 is shown as a solid vertical line in the middle. A vertical component of a current spatial position 1132 of a portion, such as a pixel or a block, of the current frame 1130 is shown as a solid line circle near the top of the representation of the current frame 1130. Relative to the current frame 1130, the first reconstructed frame 1110 is a backward reference frame and the second reconstructed frame 1120 is a forward reference frame. Although three frames are shown in FIG. 11, other frames, such as frames temporally preceding the first reconstructed (reference) frame 1110, frames between the first reconstructed (reference) frame 1110 and the current frame 1130, frame between the current frame 1130 and the second reconstructed (reference) frame 1120, frames subsequent to the second reconstructed (reference) frame 1120, or any combination thereof, may be used.

A temporal order location or frame index of the current frame 1130 may be expressed as n. The first reconstructed frame 1110 may precede the current frame 1130 in coding order, may precede the current frame 1130 in temporal order, and may have a temporal order location or frame index lower than the temporal order location or frame index, n, of the current frame 1130. The temporal, or frame index, distance between the temporal order location or frame index of the first reconstructed frame 1110 and the temporal order location or frame index of the current frame 1130, n, may be expressed as d1, and the temporal order location or frame index of the first reconstructed frame 1110 may be expressed as n−d1.

The second reconstructed frame 1120 may precede the current frame 1130 in coding order and may be subsequent to the current frame 1130 in temporal order. The second reconstructed frame 1120 may have a temporal order location or frame index greater than the temporal order location or frame index, n, of the current frame 1130. The temporal, or frame index, distance between the temporal order location or frame index of the second reconstructed frame 1120 and the temporal order location or frame index of the current frame 1130, n, may be expressed as d2, and the temporal order location or frame index of the second reconstructed frame 1120 may be expressed as n+d2.

Non-linear motion 1140 of content captured by a first input frame, corresponding to the first reconstructed frame 1110, at the first spatial position 1112, the current frame 1130 at the current spatial position 1132, and the second input frame, corresponding to the second reconstructed frame 1120, at the second spatial position 1122 is shown as a solid curved line. Estimated linear motion 1150 between the first spatial position 1112 and the second spatial position 1122 is shown using a broken line. A vertical component of a spatial position 1152 of a portion, such as a pixel or a block, of a reference coframe (not separately shown) at the frame index, n, of the current frame 1130, is shown as a broken line circle at the intersection of the estimated linear motion 1150 and the temporal location corresponding to the current frame 1130.

The current portion at the current spatial position 1132 of the current frame 1130 may be predicted, such as using motion estimation, based on the reference coframe to identify the spatial position 1152 from the reference coframe, which may include identifying a coframe motion vector indicating a spatial difference, or displacement, from the current spatial position 1132 to the spatial position 1152 in the reference coframe. The coframe motion vector 1160 may be similar to a motion vector, except as described herein or otherwise clear from context.

FIG. 12 is a flowchart diagram of an example of motion data reduction 1200 portion of inter-coding in accordance with implementations of this disclosure. Motion data reduction 1200 may be implemented in an encoder, such as the encoder 400 shown in FIG. 4. For example, the intra/inter prediction unit 410 of the encoder 400 shown in FIG. 4, may implement motion data reduction 1200. As shown in FIG. 12, motion data reduction 1200 includes identifying a current block at 1210, identifying a previously coded block at 1220, and determining whether inter-prediction for the current block is based on a reference coframe at 1230.

A current block is identified at 1210. For example, the current frame may be encoded on a block-basis, which may include encoding each block of the current frame, such as in a defined order, such as raster scan order, or another defined order. The current block may be identified in accordance with the motion estimation at 850 and the motion data reduction at 860 shown in FIG. 8.

A previously coded block is identified at 1220. For example, the encoder may search neighboring blocks using a defined search procedure to generate an ordered set of candidate previously coded blocks, which may include spatially neighboring previously coded blocks, temporally collocated previously coded blocks, or a combination thereof, and may identify a candidate previously coded block from the set of candidate previously coded blocks as the previously coded block.

Identifying the previously coded block at 1220 may include identifying coding information, such as motion information, for the previously coded block. For example, the motion information for the previously coded block may include a motion vector referring to a reference frame (single reference). In another example, the motion information for the previously coded block may include motion vectors referring to respective reference frames (compound reference). In another example, the motion information for the previously coded block may include a coframe motion vectors referring to a reference coframe (coframe reference).

The encoder determines whether inter-prediction for the current block is based on a reference coframe at 1230.

The inter-prediction for the current block may be based on a reference frame, or a combination of reference frames, other than the reference coframe, and motion data reduction 1200 may include determining whether motion information for the previously coded block includes a coframe motion vector for the previously coded block at 1240. The motion information for the previously coded block may include a coframe motion vector for the previously coded block and motion data reduction 1200 may include determining a motion vector prediction for the current block based on the coframe motion vector for the previously coded block at 1250 and may output an indication of the motion vector prediction at 1260. An example of determining the motion vector prediction for the current block based on the coframe motion vector for the previously coded block is shown at 1300 in FIG. 13.

The inter-prediction for the current block may be based on a reference coframe and motion data reduction 1200 may include identifying a coframe motion vector prediction for the current block at 1270 and may include outputting an indication of the coframe motion vector prediction at 1270. An example of determining the coframe motion vector prediction for the current block is shown at 1310 in FIG. 13.

Figure 13:
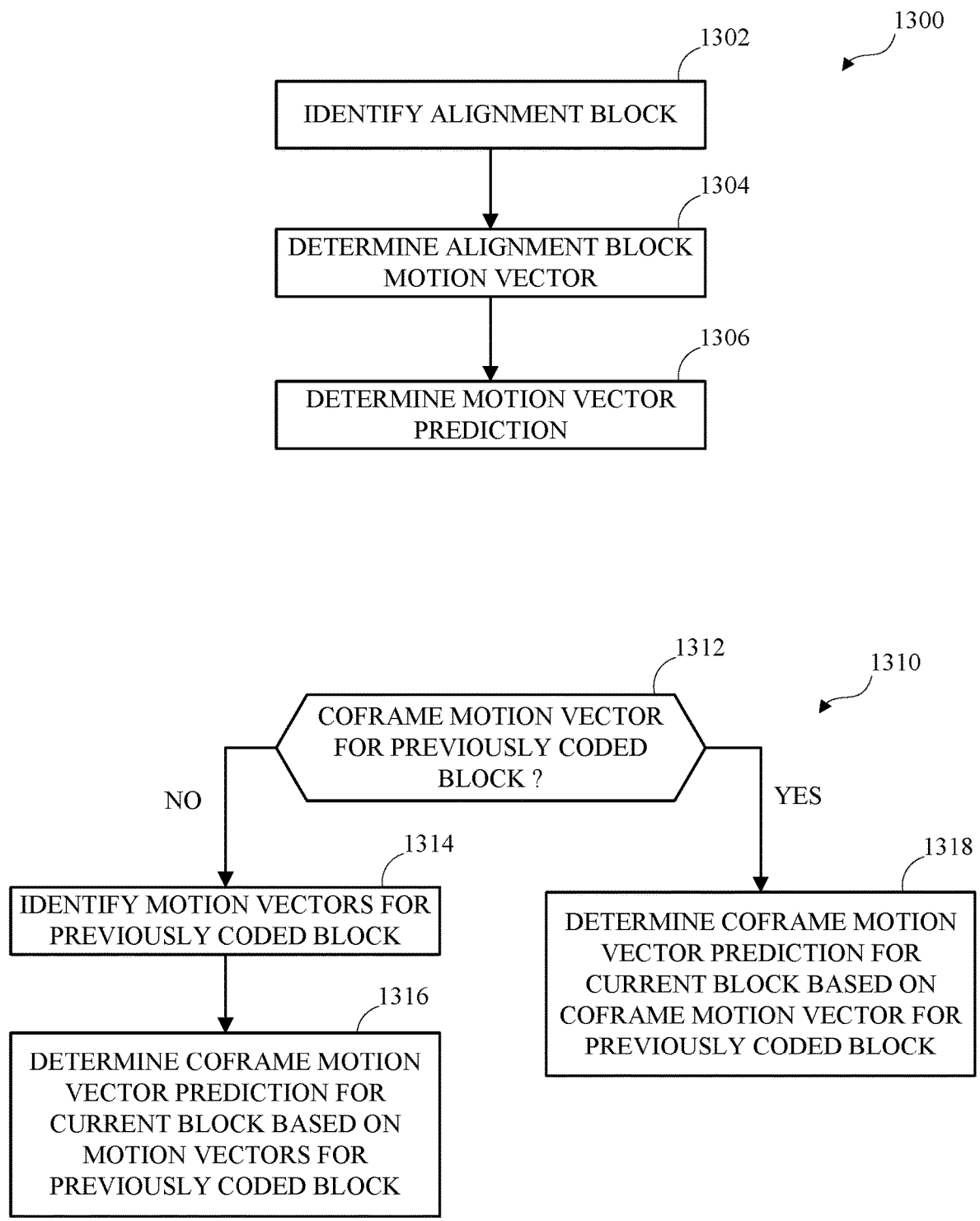
FIG. 13 shows a flowchart diagram of an example of determining a motion vector prediction for the current block based on a coframe motion vector for the previously coded block in accordance with implementations of this disclosure and an example of determining a coframe motion vector prediction for the current block in accordance with implementations of this disclosure.

FIG. 13 shows a flowchart diagram of an example of determining a motion vector prediction for the current block 1300 based on a coframe motion vector for the previously coded block in accordance with implementations of this disclosure and an example of determining a coframe motion vector prediction for the current block 1310 in accordance with implementations of this disclosure. Determining a motion vector prediction for the current block 1300 may be implemented in an encoder, such as the encoder 400 shown in FIG. 4. For example, the intra/inter prediction unit 410 of the encoder 400 shown in FIG. 4, may implement determining a motion vector prediction for the current block 1300. As shown in FIG. 13, determining a motion vector prediction for the current block 1300 includes identifying an alignment block at 1302, determining motion information for the alignment block at 1304, and determining the motion vector predictions at 1306.

An alignment block is identified at 1302. The alignment block may be identified based on a coframe motion vector from a previously coded block neighboring the current block, such as the coframe motion vector identified from the motion information for the previously decoded block as shown in FIG. 12. The alignment block may be a block, such as a 4×4 block, from the reference coframe. A spatial location of the alignment block may be centered at a location in the reference coframe spatially corresponding to the spatial location of the previously coded block in the current frame displaced, or offset, by the coframe motion vector.

Motion information for the alignment block is determined at 1304. Determining the motion information for the alignment block may include determining motion vectors from the reference coframe to the motion projection reference frames for the reference coframe. Determining the motion information for the alignment block may include determining a first motion vector (opfl_mv1), such as a backward motion vector indicating a portion of a backward reference frame. Determining the motion information for the alignment block may include determining a second motion vector (opfl_mv2), such as a forward motion vector indicating a portion of a forward reference frame. The motion vectors for the alignment block may be determined by averaging the motion field corresponding to the alignment block.

Motion vector predictions for the current block are determined at 1306. The motion vector predictions may indicate a displacement the previously coded block neighboring the current block in the current frame and the respective reference frames identified at 1304. A first motion vector prediction (MV_pred1) may be determined based on the first motion vector for the alignment block (opfl_mv1) and the coframe motion vector (cf_MV), which may be expressed as MV_pred1=cf_MV+opfl_mv1. A second motion vector prediction (MV_pred2) may be determined based on the second motion vector for the alignment block (opfl_mv2) and the coframe motion vector (cf_MV), which may be expressed as MV_pred2=cf_MV+opfl_mv2. The motion vector predictions for the previously coded block neighboring the current block may be identified as motion vector predictions for the current block. The current block may be coded with reference to a single reference frame and the motion vector prediction for the previously coded block neighboring the current block and associated with the single reference frame may be identified as motion vector predictions for the current block Determining a coframe motion vector prediction for the current block 1310 may be implemented in an encoder, such as the encoder 400 shown in FIG. 4. For example, the intra/inter prediction unit 410 of the encoder 400 shown in FIG. 4, may implement determining a coframe motion vector prediction for the current block 1310. As shown in FIG. 13, determining a coframe motion vector prediction for the current block 1310 includes determining whether motion information for the previously coded block includes a coframe motion vector for the previously coded block at 1312.

The motion information for the previously coded block may omit a coframe motion vector for the previously coded block and determining a coframe motion vector prediction for the current block 1310 may include identifying motion vectors for the previously coded block at 1314 and determining the coframe motion vector prediction based on the motion vectors for the previously coded block at 1316.

Although not shown separately in FIG. 13, determining a coframe motion vector prediction for the current block 1310 may include determining whether the motion information for the previously coded block includes compound motion vectors, such as a backward motion vector and a forward motion vector. In some implementations, the motion information for the previously coded block may include a single motion vector and determining a coframe motion vector prediction for the current block 1310 based on the previously coded block may be otherwise omitted.

In some implementations, the motion information for the previously coded block may include a backward motion vector and a forward motion vector, and the coframe motion vector prediction may be determined based on the backward motion vector and a forward motion vector at 1316. The backward motion vector for the previously coded block may refer to a backward reference frame at a first temporal distance from the current frame corresponding to a first sequential location (d1). The forward motion vector for the previously coded block may refer to a forward reference frame at a second temporal distance from the current frame corresponding to a second sequential location (d2). Determining the coframe motion vector prediction (cf_MV_pred) based on the backward motion vector (MV_ref1) and the forward motion vector (MV_ref2) may include determining a sum of a product of a quotient of the second sequential location (d2) and a sum of the first sequential location (d1) and the second sequential location (d2) and the backward motion vector (MV_ref1) and a product of a quotient of the first sequential location (d1) and the sum of the first sequential location (d1) and the second sequential location (d2) and the forward motion vector (MV_ref2), which may be expressed as the following:

$$cf\_MV\_pred = d2/(d1+d2)*MV\_ref1 + d1/(d1+d2)*MV\_ref2. \quad \text{[Equation 1]}$$

The motion information for the previously coded block may include a coframe motion vector for the previously coded block and determining a coframe motion vector prediction for the current block 1310 may include using the coframe motion vector for the previously coded block as the coframe motion vector prediction for the current block at 1318.

Figure 14:
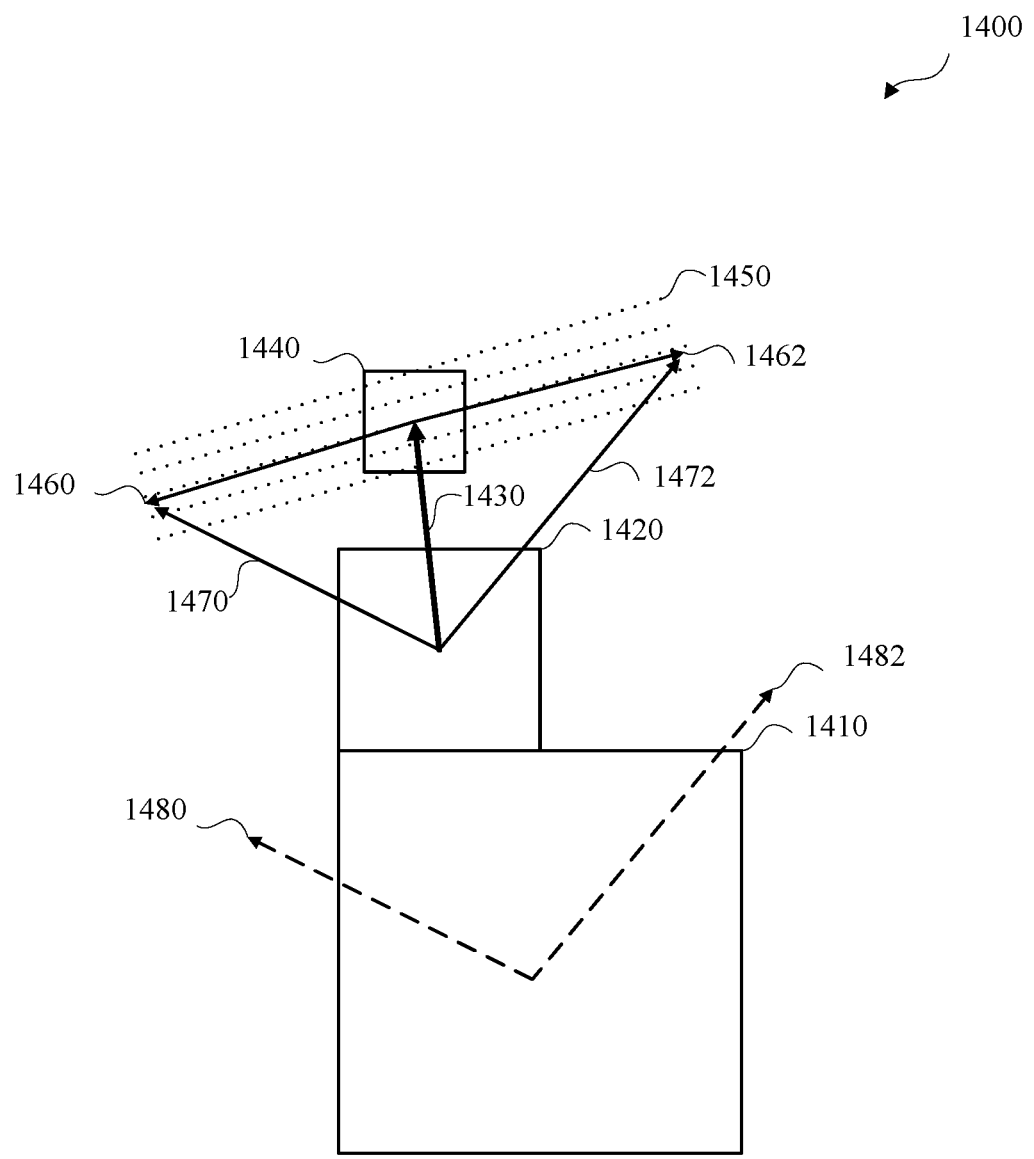
FIG. 14 is a diagram of an example of determining a motion vector prediction for the current block based on a coframe motion vector for the previously coded block in accordance with implementations of this disclosure.

FIG. 14 is a diagram of an example of determining a motion vector prediction for the current block 1400 based on a coframe motion vector for the previously coded block in accordance with implementations of this disclosure. Determining the motion vector prediction for the current block 1400 may be similar to determining the motion vector prediction for the current block as shown at 1300 in FIG. 13, except as described herein or otherwise clear from context.

FIG. 14 shows a representation of a current block 1410 from a current frame. A neighboring block 1420, which is a previously coded block, is shown adjacent to the current block 1410. A bold directional line indicates a coframe motion vector 1430 for the neighboring block 1420. The coframe motion vector 1430 indicates a spatial displacement between a spatial location in the reference coframe corresponding spatially with the neighboring block 1420 in the current frame and a spatial location of an alignment block 1440 in the reference coframe. The alignment block 1440 may be a block, such as a 4×4 block, from the reference coframe.

A motion field 1450 for the reference coframe at the alignment block 1440 is indicated using dotted lines. A backward motion vector 1460 for the alignment block 1440 and a forward motion vector 1462 for the alignment block 1440 may be identified based on the motion field 1450. The backward motion vector 1460 for the alignment block 1440 may refer to a backward reference frame (not shown). The forward motion vector 1462 for the alignment block 1440 may refer to a forward reference frame (not shown).

A backward motion vector prediction 1470 for the neighboring block 1420 indicates a spatiotemporal displacement between the location in the backward reference frame indicated by the backward motion vector 1460 for the alignment block 1440 and the location in the current frame of the neighboring block 1420. A forward motion vector prediction 1472 for the neighboring block 1420 indicates a spatiotemporal displacement between the location in the forward reference frame indicated by the forward motion vector 1462 for the alignment block 1440 and the location in the current frame of the neighboring block 1420.

A backward motion vector prediction 1480 for the current block 1410 indicates a spatiotemporal displacement between a location in the backward reference frame indicated by the backward motion vector prediction 1480 for the current block 1410 and the location in the current frame of the current block 1410 and is indicated using a broken directional line. A forward motion vector prediction 1482 for the current block 1410 indicates a spatiotemporal displacement between a location in the forward reference frame indicated by the forward motion vector prediction 1482 for the current block 1410 and the location in the current frame of the current block 1410 and is indicated using a broken directional line.

FIG. 15 is a flowchart diagram of an example of inter-prediction using a reference coframe 1500 in accordance with implementations of this disclosure. Inter-prediction using a reference coframe 1500 may be implemented in a decoder, such as the decoder 500 shown in FIG. 5. For example, the intra/inter prediction unit 540 of the decoder 500 shown in FIG. 5, may implement inter-prediction using a reference coframe 1500.

As shown in FIG. 15, inter-prediction using a reference coframe 1500 includes identifying a current block at 1510, decoding current block motion information at 1520, identifying a previously decoded block at 1530, and determining whether to identify a prediction block based on a reference coframe at 1540.

A current block from a current frame is identified at 1510. For example, the current frame may be decoded on a block-basis, which may include decoding each block of the current frame, such as in a defined order, such as raster scan order, or another defined order.

Coding information for the current block is decoded at 1520. Decoding the coding information for the current block may include decoding the coding information for the current block from the encoded bitstream.

A previously decoded block is identified at 1530. The previously decoded block may be identified based on the coding information for the current block. For example, the coding information for the current block decoded at 1520 may identify a coding mode, such as an inter-prediction mode, for the current block, and the previously decoded block may be identified based on the coding mode for the current block. In some implementations, the decoder may search neighboring blocks using a defined search procedure to generate an ordered set of candidate previously decoded blocks, which may include spatially neighboring previously decoded blocks, temporally collocated previously decoded blocks, or a combination thereof, and the coding information for the current block, such as the coding mode, may indicate a candidate previously decoded block from the set of candidate previously decoded blocks as the previously decoded block.

Identifying the previously decoded block at 1530 may include identifying coding information, such as motion information, for the previously decoded block. For example, the motion information for the previously coded block may include a motion vector referring to a reference frame (single reference). In another example, the motion information for the previously coded block may include motion vectors referring to respective reference frames (compound reference). In another example, the motion information for the previously coded block may include a coframe motion vectors referring to a reference coframe (coframe reference).

Whether to identify a prediction block based on a reference coframe is determined at 1540. Whether to identify the prediction block based on the reference coframe may be determined based on the coding information for the current block.

The coding information for the current bock may indicate that the current block is coded with reference to a reference frame, such as a temporal reference frame, which may be a previously reconstructed frame, and which may differ from a reference coframe. The decoder may determine that the coding information for the current block indicates that the current block is coded with reference to the reference frame, the decoder may determine that identifying the prediction block for decoding the current block based on the reference coframe may be omitted, and the decoder may determine whether the motion information for the previously decoded block includes a coframe motion vector for the previously decoded block at 1550. The decoder may determine that the motion information for the previously decoded block includes the coframe motion vector for the previously decoded block at 1550, and the decoder may determine the prediction block for the current block based on the coframe motion vector for the previously decoded block at 1560. An example of determining the prediction block for the current block based on the coframe motion vector for the previously decoded block is shown in FIG. 15.

Although inter-prediction using a reference coframe 1500 is described with reference to one previously decoded block, inter-prediction using a reference coframe 1500 may include identifying multiple previously decoded blocks at 1530 and, for each previously decoded block determined as including a coframe motion vector at 1550, determining a respective candidate prediction block at 1560.

Figure 16:
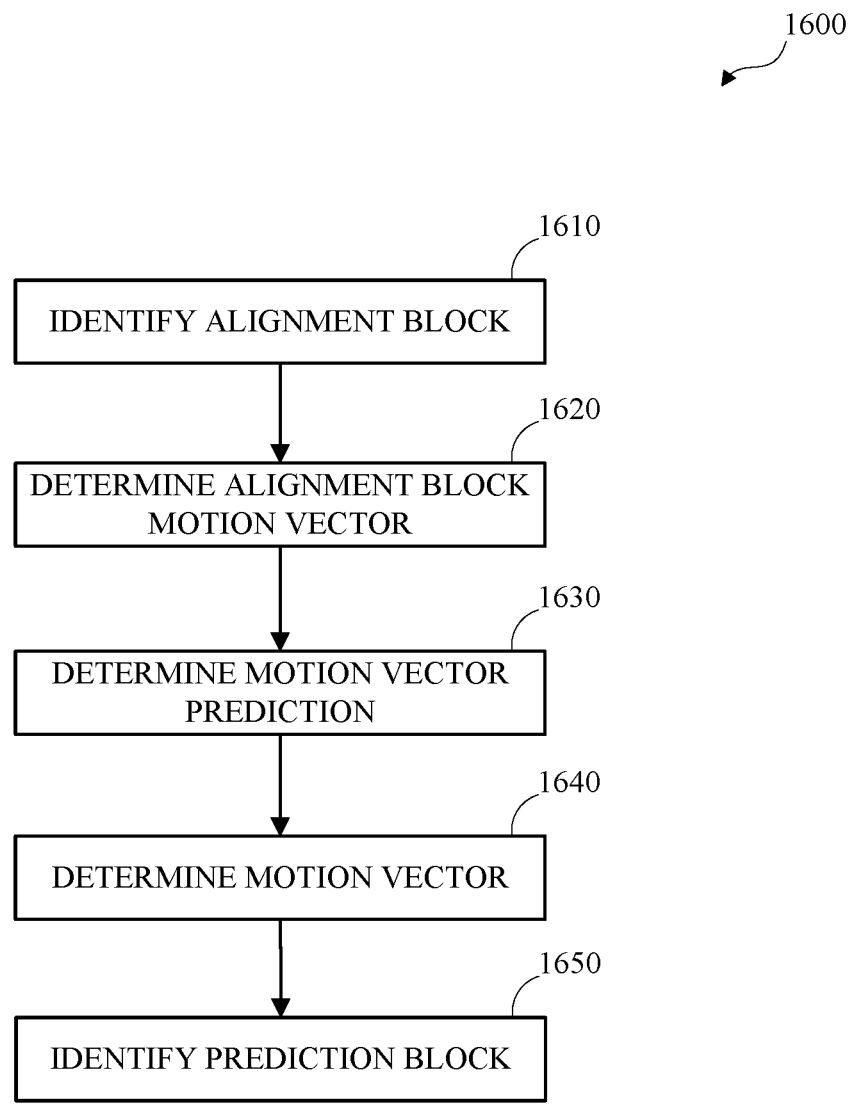
FIG. 16 is a flowchart diagram of an example of determining a prediction block based on a coframe motion vector from a previously coded block in accordance with implementations of this disclosure.

The coding information for the current bock may indicate that the current block is coded with reference to the reference coframe. The decoder may determine that the coding information for the current block indicates that the current block is coded with reference to the reference coframe, and the decoder may identify the prediction block for the current block based on the reference coframe at 1570. An example of determining the prediction block for the current block based on the reference coframe is shown in FIG. 16. Although inter-prediction using a reference coframe 1500 is described with reference to one previously decoded block, inter-prediction using a reference coframe 1500 may include identifying multiple previously decoded blocks at 1530 and, for each previously decoded block, determining a respective candidate prediction block at 1570.

FIG. 16 is a flowchart diagram of an example of determining a prediction block 1600 based on a coframe motion vector from a previously coded block in accordance with implementations of this disclosure. Determining a prediction block 1600 may be implemented in a decoder, such as the decoder 500 shown in FIG. 5. For example, the intra/inter prediction unit 540 of the decoder 500 shown in FIG. 5, may implement determining a prediction block 1600.

As shown in FIG. 16, determining a prediction block 1600 includes identifying an alignment block at 1610, determining motion information for the alignment block at 1620, determining motion vector predictions at 1630, determining motion vectors at 1640, and identifying a prediction block at 1650.

An alignment block is identified at 1610. The alignment block may be identified based on a coframe motion vector from a previously coded block neighboring the current block, such as the coframe motion vector identified from the motion information for the previously decoded block as shown in FIG. 14. The alignment block may be a block, such as a 4×4 block, from the reference coframe. A spatial location of the alignment block may be centered at a location in the reference coframe spatially corresponding to the spatial location of the previously coded block in the current frame displaced, or offset, by the coframe motion vector (cf_MV).

Motion information for the alignment block is determined at 1620. Determining the motion information for the alignment block may include determining motion vectors indicating a displacement from the reference coframe to the motion projection reference frames for the reference coframe. Determining the motion information for the alignment block may include determining a first motion vector (opfl_mv1), such as a backward motion vector indicating a portion of a backward reference frame. Determining the motion information for the alignment block may include determining a second motion vector (opfl_mv2), such as a forward motion vector indicating a portion of a forward reference frame. The motion vectors for the alignment block may be determined by averaging the motion field corresponding to the alignment block.

Motion vector predictions for the current block are determined at 1630. The motion vector predictions may indicate a displacement the previously coded block neighboring the current block in the current frame and the respective reference frames identified at 1620. A first motion vector prediction (MV_pred1) may be determined based on the first motion vector for the alignment block (opfl_mv1) and the coframe motion vector (cf_MV), which may be expressed as MV_pred1=cf_MV+opfl_mv1. A second motion vector prediction (MV_pred2) may be determined based on the second motion vector for the alignment block (opfl_mv2) and the coframe motion vector (cf_MV), which may be expressed as MV_pred2=cf_MV+opfl_mv2. The motion vector predictions for the previously coded block neighboring the current block may be identified as motion vector predictions for the current block.

Motion vectors for the current block are determined at 1640. Although not shown separately in FIG. 16, determining the motion vectors for the current block may include determining whether the motion information for the current block includes differential motion vectors. The coding information for the current block may omit differential motion vectors, and the motion vector predictions for the current block may be identified as the motion vectors for the current block. The coding information for the current block may include differential motion vectors, a sum of a backward differential motion vector and the backward motion vector prediction may be identified as the backward motion vector for the current block, and a sum of a forward differential motion vector and the forward motion vector prediction may be identified as the forward motion vector for the current block.

A prediction block for decoding the current block is identified at 1650. For example, a compound reference prediction block may be identified based on the Motion vectors for the current block determined at 1640.

Figure 17:
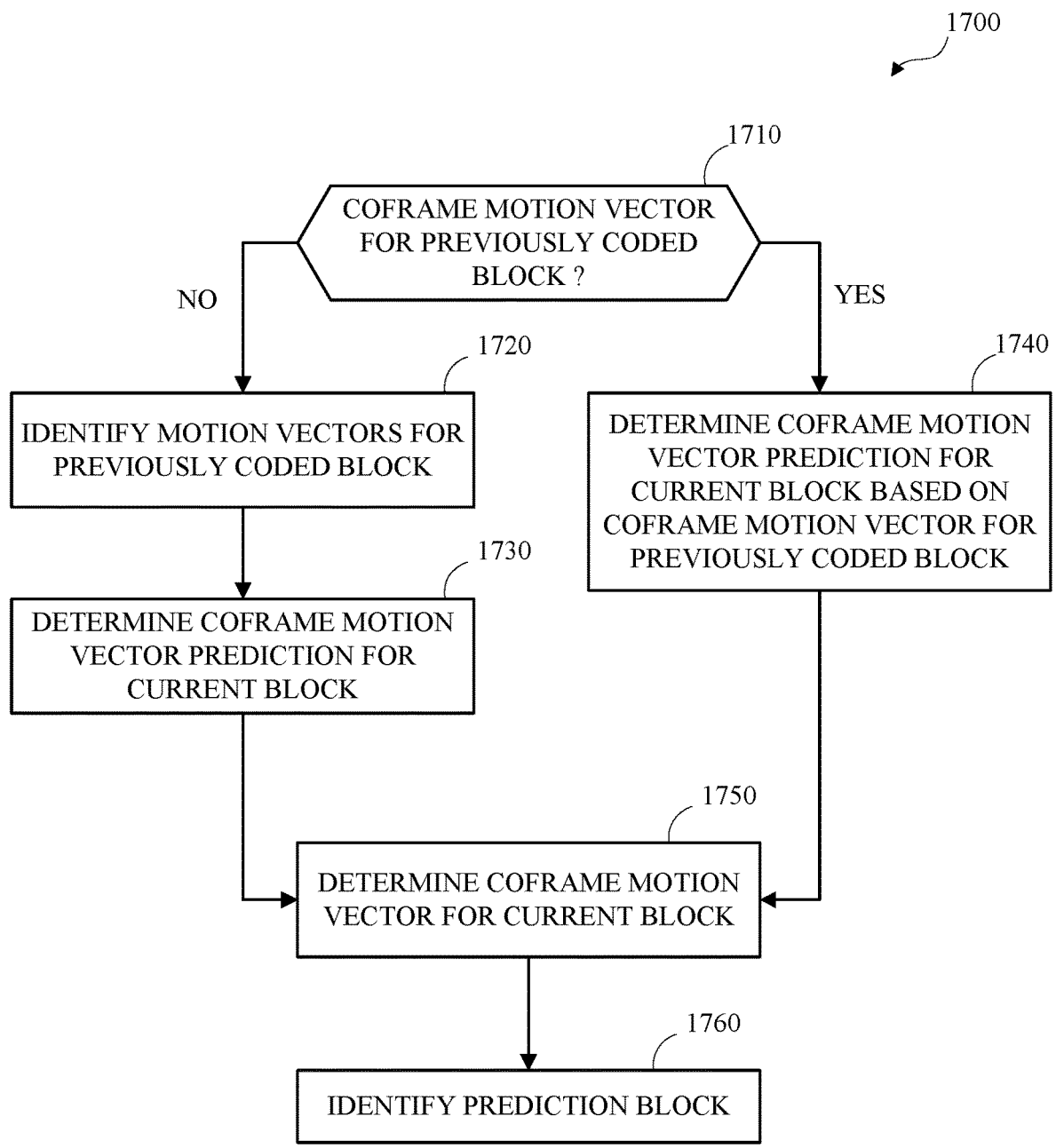
FIG. 17 is a flowchart diagram of an example of determining the prediction block for the current block based on the reference coframe in accordance with implementations of this disclosure.

FIG. 17 is a flowchart diagram of an example of determining the prediction block for the current block based on the reference coframe 1700 in accordance with implementations of this disclosure. Determining the prediction block for the current block based on the reference coframe 1700 may be implemented in a decoder, such as the decoder 500 shown in FIG. 5. For example, the intra/inter prediction unit 540 of the decoder 500 shown in FIG. 5, may implement determining the prediction block for the current block based on the reference coframe 1700.

As shown in FIG. 17, determining the prediction block for the current block based on the reference coframe 1700 includes determining whether the motion information for the previously coded block includes a coframe motion vector for the previously coded block at 1710.

The motion information for the previously coded block may omit the coframe motion vector for the previously coded block and determining the prediction block for the current block based on the reference coframe 1700 may include identifying motion vectors for the previously coded block at 1720, determining the coframe motion vector prediction for the current block at 1730, determining a coframe motion vector for the current block at 1740, and identifying the prediction block at 1750.

One or more motion vectors for the previously coded block may be identified from the motion information for the previously coded block at 1720. Although not shown separately in FIG. 17, determining the prediction block for the current block based on the reference coframe 1700 may include determining whether the motion information for the previously coded block includes compound motion vectors, such as a backward motion vector and a forward motion vector. In some implementations, the motion information for the previously coded block may include a single motion vector and determining the prediction block for the current block based on the reference coframe 1700 based on the previously coded block may be otherwise omitted.

In some implementations, the motion information for the previously coded block may include a backward motion vector and a forward motion vector, and the coframe motion vector prediction for the current block may be determined based on the backward motion vector and a forward motion vector at 1730. The backward motion vector for the previously coded block may refer to a backward reference frame at a first temporal distance (d1) from the current frame. The forward motion vector for the previously coded block may refer to a forward reference frame at a second temporal distance (d2) from the current frame. Determining the coframe motion vector prediction (cf_MV_pred) based on the backward motion vector (MV_ref1) and the forward motion vector (MV_ref2) may be expressed as shown in Equation 1.

The motion information for the previously coded block may include the coframe motion vector for the previously coded block and determining the prediction block for the current block based on the reference coframe 1700 may include using the coframe motion vector for the previously coded block as the coframe motion vector prediction for the current block at 1740.

A coframe motion vector for the current block is determined at 1750. Although not shown separately in FIG. 17, determining the coframe motion vector for the current block may include determining whether the motion information for the current block includes a differential coframe motion vector. The coding information for the current block may omit a differential coframe motion vector, and the coframe motion vector prediction for the current block may be identified as the coframe motion vector for the current block. The coding information for the current block may include a differential coframe motion vector and a sum of the differential coframe motion vector and the coframe motion vector prediction may be identified as the coframe motion vector for the current block.

A prediction block for decoding the current block is identified at 1760. For example, the prediction block may be identified based on a portion of the reference coframe indicated by the coframe motion vector identified at 1750 relative to the location of the current block in the current frame.

Figure 18:
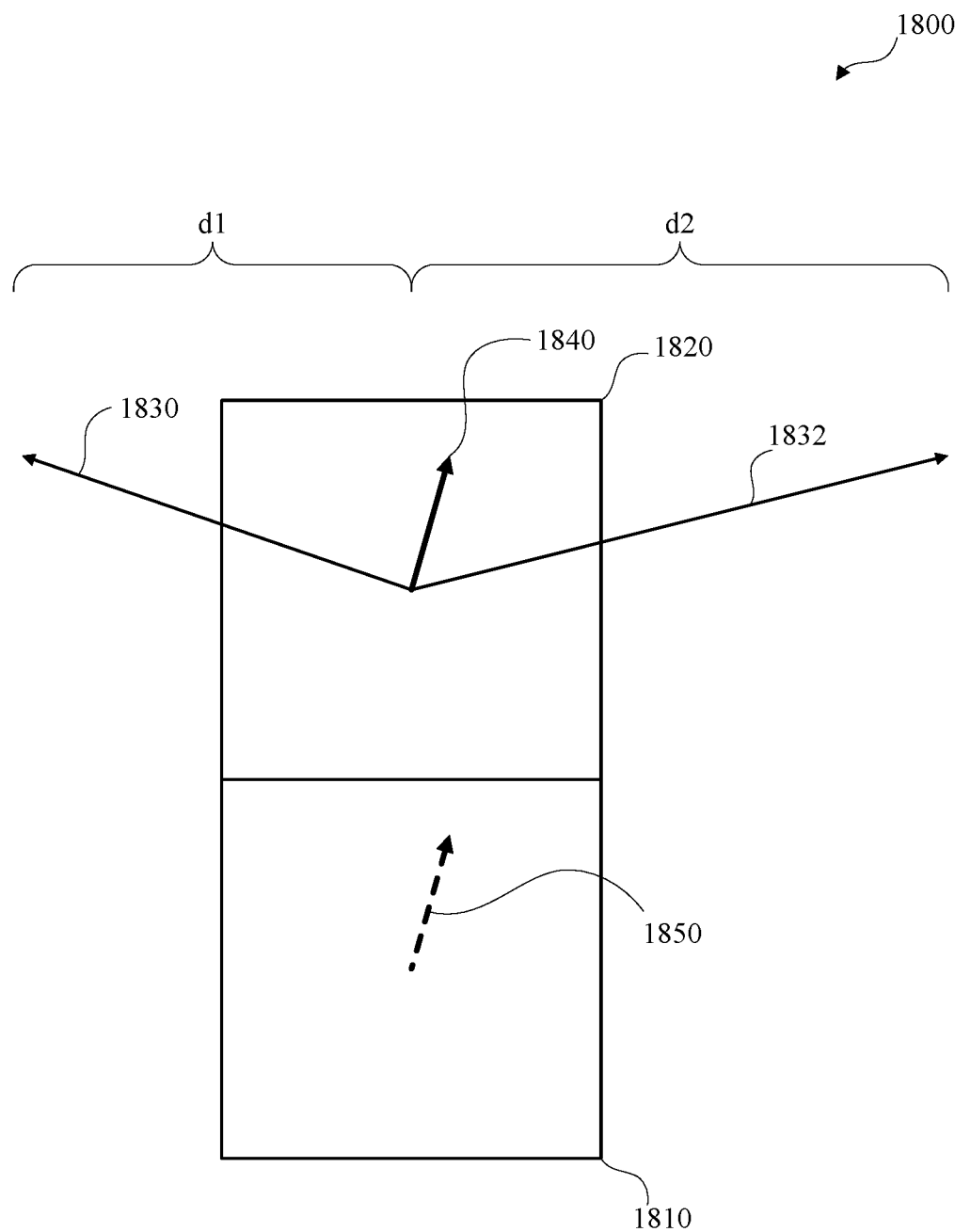
FIG. 18 is a diagram of an example of determining a coframe motion vector prediction for the current block based on a motion vector for the previously coded block in accordance with implementations of this disclosure.

FIG. 18 is a diagram of an example of determining a coframe motion vector prediction for the current block 1800 based on a motion vector for the previously coded block in accordance with implementations of this disclosure. Determining the coframe motion vector prediction for the current block 1800 based on a motion vector for the previously coded block may be similar to determining the coframe motion vector prediction as shown at 1730 in FIG. 17, except as described herein or otherwise clear from context.

FIG. 18 shows a representation of a current block 1810 from a current frame. A neighboring block 1820, which is a previously coded block, is shown adjacent to the current block 1810. A backward motion vector 1830 for the neighboring block 1820 and a forward motion vector 1832 for the neighboring block 1820 may be identified based on the motion information for the previously coded neighboring block 1820. The backward motion vector 1830 for the neighboring block 1820 may refer to a backward reference frame (not shown) for coding the neighboring block 1820. A temporal, or frame index, distance between the backward reference frame and the current frame is indicated at d1. The forward motion vector 1832 for the neighboring block 1820 may refer to a forward reference frame (not shown) for coding the neighboring block 1820. A temporal, or frame index, distance between the forward reference frame and the current frame is indicated at d2.

A bold directional line indicates a coframe motion vector prediction 1840 for the neighboring block 1820. The coframe motion vector prediction 1840 may be generated based on the backward motion vector 1830 for the neighboring block 1820, the temporal, or frame index, distance between the backward reference frame and the current frame is indicated at d1, the forward motion vector 1832 for the neighboring block 1820, and the temporal, or frame index, distance between the forward reference frame and the current frame is indicated at d2. A bold broken directional line indicates a coframe motion vector prediction 1850 for the current block 1810, which may be identified based on the coframe motion vector prediction 1840 for the neighboring block 1820.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
   generating, by a processor executing instructions stored on a non-transitory computer-readable medium, a decoded frame by decoding a current frame from an encoded bitstream, wherein decoding includes:
   identifying a current block from the current frame;
   identifying a previously decoded block based on coding information for the current block;
   determining whether motion information for the previously decoded block includes a coframe motion vector for the previously decoded block;
   determining whether to identify a prediction block for decoding the current block based on a reference coframe;
   in response to a determination to omit identifying the prediction block for decoding the current block based on the reference coframe:
   in response to a determination that the motion information for the previously decoded block includes the coframe motion vector for the previously decoded block:
   identifying an alignment block in the reference coframe based on a spatial location of the previously decoded block and the coframe motion vector for the previously decoded block;
   determining a motion vector for the alignment block based on motion field information for the alignment block;
   determining a motion vector prediction for the current block based on the motion vector for the alignment block and the coframe motion vector for the previously decoded block;
   determining a motion vector for the current block based on the motion vector prediction for the current block; and
   identifying the prediction block based on a reference frame indicated by the motion vector for the current block;
   in response to a determination to identify the prediction block for decoding the current block based on the reference coframe:
   in response to a determination that the motion information for the previously decoded block includes the coframe motion vector for the previously decoded block:
   determining a coframe motion vector prediction for the current block based on the coframe motion vector for the previously decoded block;
   in response to a determination that the motion information for the previously decoded block omits the coframe motion vector for the previously decoded block:
   identifying a forward motion vector from the motion information for the previously decoded block;
   identifying a backward motion vector from the motion information for the previously decoded block;
   determining a coframe motion vector prediction for the current block based on the forward motion vector and the backward motion vector;

determining a coframe motion vector for the current block based on the coframe motion vector prediction for the current block; and identifying the prediction block based on the reference coframe and the coframe motion vector for the current block;

generating a decoded block corresponding to the current block based on the prediction block; and including the decoded block in the decoded frame; and outputting a reconstructed frame based on the decoded frame.

2. The method of claim 1, wherein decoding includes:

generating the reference coframe for the current frame based on a motion field at a spatiotemporal location corresponding to a spatiotemporal location of the current frame such that the reference coframe is indicative of linear motion at the spatiotemporal location among a sequence of frames, wherein the sequence of frames includes the current frame.

3. The method of claim 1, wherein:

the coframe motion vector for the previously decoded block indicates a spatial displacement between a location of the previously decoded block in the current frame and a location in the reference coframe; and the coframe motion vector for the current block indicates a spatial displacement between a location of the current block in the current frame and a location in the reference coframe.

4. The method of claim 1, wherein determining whether to identify the prediction block for decoding the current block based on the reference coframe includes:

decoding the coding information for the current block from the encoded bitstream; and determining whether to identify the prediction block for decoding the current block based on the reference coframe based on the coding information for the current block.

5. The method of claim 1, wherein determining the motion vector for the alignment block includes:

obtaining the motion vector for the alignment block by averaging the motion field information corresponding to the alignment block.

6. The method of claim 1, wherein determining the motion vector prediction for the current block based on the motion vector for the alignment block and the coframe motion vector for the previously decoded block includes:

determining a motion vector prediction for the previously decoded block based on the motion vector for the alignment block and the coframe motion vector for the previously decoded block; and identifying the motion vector prediction for the previously decoded block as the motion vector prediction for the current block.

7. The method of claim 1, wherein:

determining the motion vector for the alignment block includes:

determining a first motion vector for the alignment block; and determining a second motion vector for the alignment block; and determining the motion vector prediction for the current block includes:

determining a first motion vector prediction for the current block as a sum of the first motion vector for the alignment block and the coframe motion vector; and determining a second motion vector prediction for the current block as a sum of the second motion vector for the alignment block and the coframe motion vector.

8. The method of claim 1, wherein:

the current frame is a frame from a sequence of frames, wherein each frame from the sequence of frames has a respective sequential location in the sequence of frames, wherein the current frame has a current sequential location in the sequence of frames;

the backward motion vector indicates a backward reference frame at a first sequential location preceding the current sequential location;

the forward motion vector indicates a forward reference frame at a second sequential location subsequent to the current sequential location; and determining the coframe motion vector prediction for the current block includes:

determining a sum of a product of a quotient of the second sequential location and a sum of the first sequential location and the second sequential location and the backward motion vector and a product of a quotient of the first sequential location and the sum of the first sequential location and the second sequential location and the forward motion vector.

9. A method comprising:

generating, by a processor executing instructions stored on a non-transitory computer-readable medium, an encoded frame by encoding a current frame from an input bitstream, wherein encoding includes:

identifying a current block from the current frame;

identifying a previously coded block;

determining whether motion information for the previously coded block includes a coframe motion vector for the previously coded block;

determining whether to identify a prediction block for encoding the current block based on a reference coframe;

in response to a determination to omit identifying the prediction block for encoding the current block based on the reference coframe:

in response to a determination that the motion information for the previously coded block includes the coframe motion vector for the previously coded block:

identifying an alignment block in the reference coframe based on a spatial location of the previously coded block and the coframe motion vector for the previously coded block;

determining a motion vector for the alignment block based on motion field information for the alignment block;

determining a motion vector prediction for the current block based on the motion vector for the alignment block and the coframe motion vector for the previously coded block; and including an indication of the motion vector prediction for the current block in an output bitstream; and in response to a determination to identify the prediction block for encoding the current block based on the reference coframe, determining a coframe motion vector prediction for the current block, wherein determining the coframe motion vector prediction for the current block includes:

in response to a determination that the motion information for the previously coded block includes the coframe motion vector for the previously coded block:
    determining the coframe motion vector prediction for the current block based on the coframe motion vector for the previously coded block;
in response to a determination that the motion information for the previously coded block omits the coframe motion vector for the previously coded block:
    identifying a forward motion vector from the motion information for the previously coded block;
    identifying a backward motion vector from the motion information for the previously coded block; and
    determining the coframe motion vector prediction for the current block based on the forward motion vector and the backward motion vector; and
including the indication of the coframe motion vector prediction for the current block in the output bitstream; and
outputting the output bitstream.

10. The method of claim 9, wherein encoding includes:
generating the reference coframe for the current frame based on a motion field at a spatiotemporal location corresponding to a spatiotemporal location of the current frame such that the reference coframe is indicative of linear motion at the spatiotemporal location among a sequence of frames, wherein the sequence of frames includes the current frame.

11. The method of claim 9, wherein:
the coframe motion vector for the previously coded block indicates a spatial displacement between a location of the previously coded block in the current frame and a location in the reference coframe; and
the coframe motion vector for the current block indicates a spatial displacement between a location of the current block in the current frame and a location in the reference coframe.

12. The method of claim 9, wherein determining the motion vector for the alignment block includes:
obtaining the motion vector for the alignment block by averaging the motion field information corresponding to the alignment block.

13. The method of claim 9, wherein determining the motion vector prediction for the current block based on the motion vector for the alignment block and the coframe motion vector for the previously coded block includes:
determining a motion vector prediction for the previously coded block based on the motion vector for the alignment block and the coframe motion vector for the previously coded block; and
identifying the motion vector prediction for the previously coded block as the motion vector prediction for the current block.

14. The method of claim 9, wherein:
determining the motion vector for the alignment block includes:
    determining a first motion vector for the alignment block; and
    determining a second motion vector for the alignment block; and
determining the motion vector prediction for the current block includes:
    determining a first motion vector prediction for the current block as a sum of the first motion vector for the alignment block and the coframe motion vector; and
    determining a second motion vector prediction for the current block as a sum of the second motion vector for the alignment block and the coframe motion vector.

15. The method of claim 9, wherein:
the current frame is a frame from a sequence of input frames, wherein each frame from the sequence of input frames has a respective sequential location in the sequence of input frames, wherein the current frame has a current sequential location in the sequence of input frames;
the backward motion vector indicates a backward reference frame at a first sequential location preceding the current sequential location;
the forward motion vector indicates a forward reference frame at a second sequential location subsequent to the current sequential location; and
determining the coframe motion vector prediction for the current block includes:
    determining a sum of a product of a quotient of the second sequential location and a sum of the first sequential location and the second sequential location and the backward motion vector and a product of a quotient of the first sequential location and the sum of the first sequential location and the second sequential location and the forward motion vector.

\* \* \* \* \*